(12) United States Patent
Islam et al.

(10) Patent No.: US 12,555,302 B2
(45) Date of Patent: Feb. 17, 2026

(54) PERSISTENT GRAPHICS MEMORY FOR RENDER TARGETS

(71) Applicant: QUALCOMM Incorporated, San Diego, CA (US)

(72) Inventors: Md Wahidul Islam, Folsom, CA (US); Jonnala Gadda Nagendra Kumar, San Diego, CA (US); Andrew Evan Gruber, Arlington, MA (US); Avinash Seetharamaiah, San Diego, CA (US); Tao Wang, Sunnyvale, CA (US); Brendon Lewis Johnson, San Diego, CA (US); Thomas Edwin Frisinger, Shrewsbury, MA (US); Zhenbiao Ma, Saratoga, CA (US); Raghavendra Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 18/520,517

(22) Filed: Nov. 27, 2023

(65) Prior Publication Data

US 2025/0173946 A1 May 29, 2025

(51) Int. Cl.
*G06T 15/00* (2011.01)
*G06T 1/00* (2006.01)
*G06T 1/60* (2006.01)

(52) U.S. Cl.
CPC .............. *G06T 15/005* (2013.01); *G06T 1/60* (2013.01)

(58) Field of Classification Search
CPC ................................ G06T 15/005; G06T 1/60
See application file for complete search history.

(56) References Cited

U.S. PATENT DOCUMENTS

| | | | |
|---|---|---|---|
| 6,831,652 B1 * | 12/2004 | Orr | G06T 15/00 345/503 |
| 2017/0358054 A1 | 12/2017 | Ciechanowski et al. | |
| 2019/0073747 A1 * | 3/2019 | Burch | G06T 3/04 |
| 2022/0083473 A1 | 3/2022 | Sharma et al. | |

OTHER PUBLICATIONS

International Search Report and Written Opinion—PCT/US2024/051785—ISA/EPO—Jan. 29, 2025.

* cited by examiner

*Primary Examiner* — Mahelet Shiberou
(74) *Attorney, Agent, or Firm* — Procopio, Cory, Hargreaves & Savitch LLP

(57) ABSTRACT

Aspects presented herein relate to methods and devices for graphics processing including an apparatus, e.g., a GPU. The apparatus may obtain an indication of a plurality of render targets (RTs) associated with a rendering process, where each of the plurality of RTs is associated with a subset of a graphics surface for the rendering process. The apparatus may also select at least one RT in the plurality of RTs based on the subset of the graphics surface associated with the at least one RT. Further, the apparatus may store the selected at least one RT in a buffer or a cache, or refraining from storing the selected at least one RT in the buffer or the cache.

28 Claims, 12 Drawing Sheets

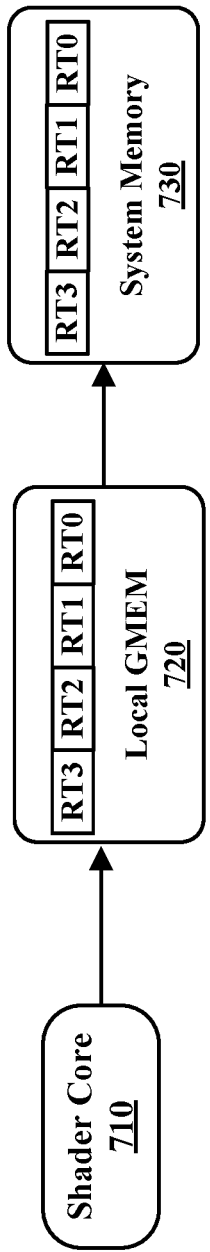
FIG. 7A Bin Rendering Approach with MRTs 702
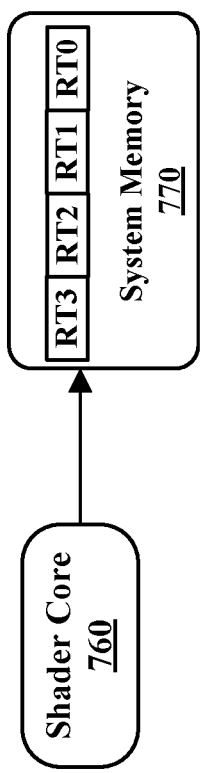
FIG. 7B Direct Rendering Approach with MRTs 752

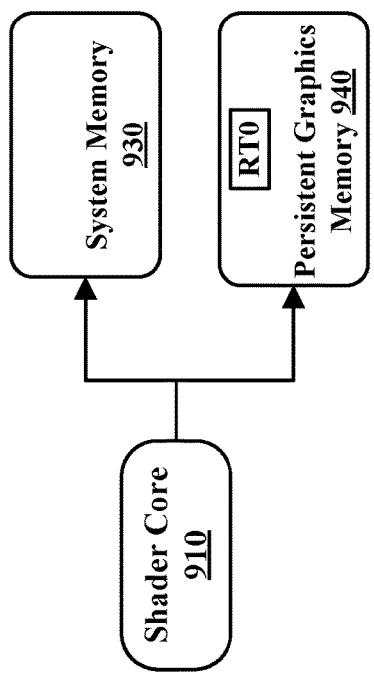
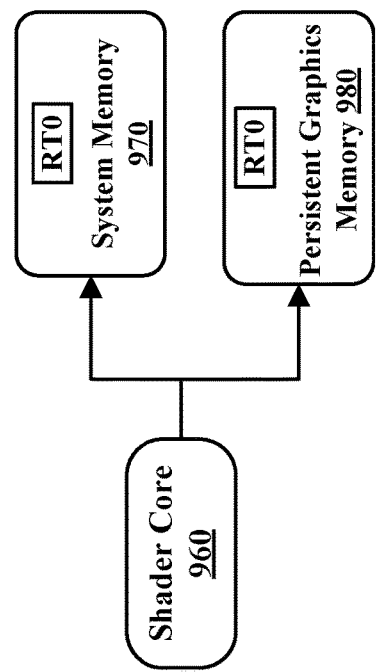
FIG. 9A
FIG. 9B

PERSISTENT GRAPHICS MEMORY FOR RENDER TARGETS

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

Currently, there is a need for improved graphics processing. For instance, current node storage techniques in graphics processing may not efficiently store acceleration structures. Accordingly, there has developed an increased need for improved node storage techniques to efficiently store acceleration structures.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a GPU, or any apparatus that may perform graphics processing. The apparatus may obtain an indication of a plurality of render targets (RTs) associated with a rendering process, where each of the plurality of RTs is associated with a subset of a graphics surface for the rendering process. The apparatus may also select at least one RT in the plurality of RTs based on the subset of the graphics surface associated with the at least one RT. The apparatus may also determine whether there is space in the buffer or the cache for storing the at least one RT. Additionally, the apparatus may allocate, based on there being space in the buffer or the cache for storing the at least one RT, the subset of the graphics surface associated with the at least one RT to the buffer or the cache. The apparatus may also remove, based on there not being space in the buffer or the cache for storing the at least one RT, a portion of the buffer or the cache in order to allocate the subset of the graphics surface associated with the at least one RT; or determine whether there is an updated command buffer or an updated command list for the subset of the graphics surface associated with the at least one RT. The apparatus may also store the selected at least one RT in a buffer or a cache, or refrain from storing the selected at least one RT in the buffer or the cache. Moreover, the apparatus may write, to at least one memory, one or more remaining RTs in the plurality of RTs, where the one or more remaining RTs do not include the selected at least one RT. The apparatus may also output an indication of the selected at least one RT in the plurality of RTs.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7A is a diagram illustrating an example rendering approach.

FIG. 7B is a diagram illustrating an example rendering approach.

FIG. 9A is a diagram illustrating an example surface allocation approach.

FIG. 9B is a diagram illustrating an example surface allocation approach.

DETAILED DESCRIPTION

Figure 1:
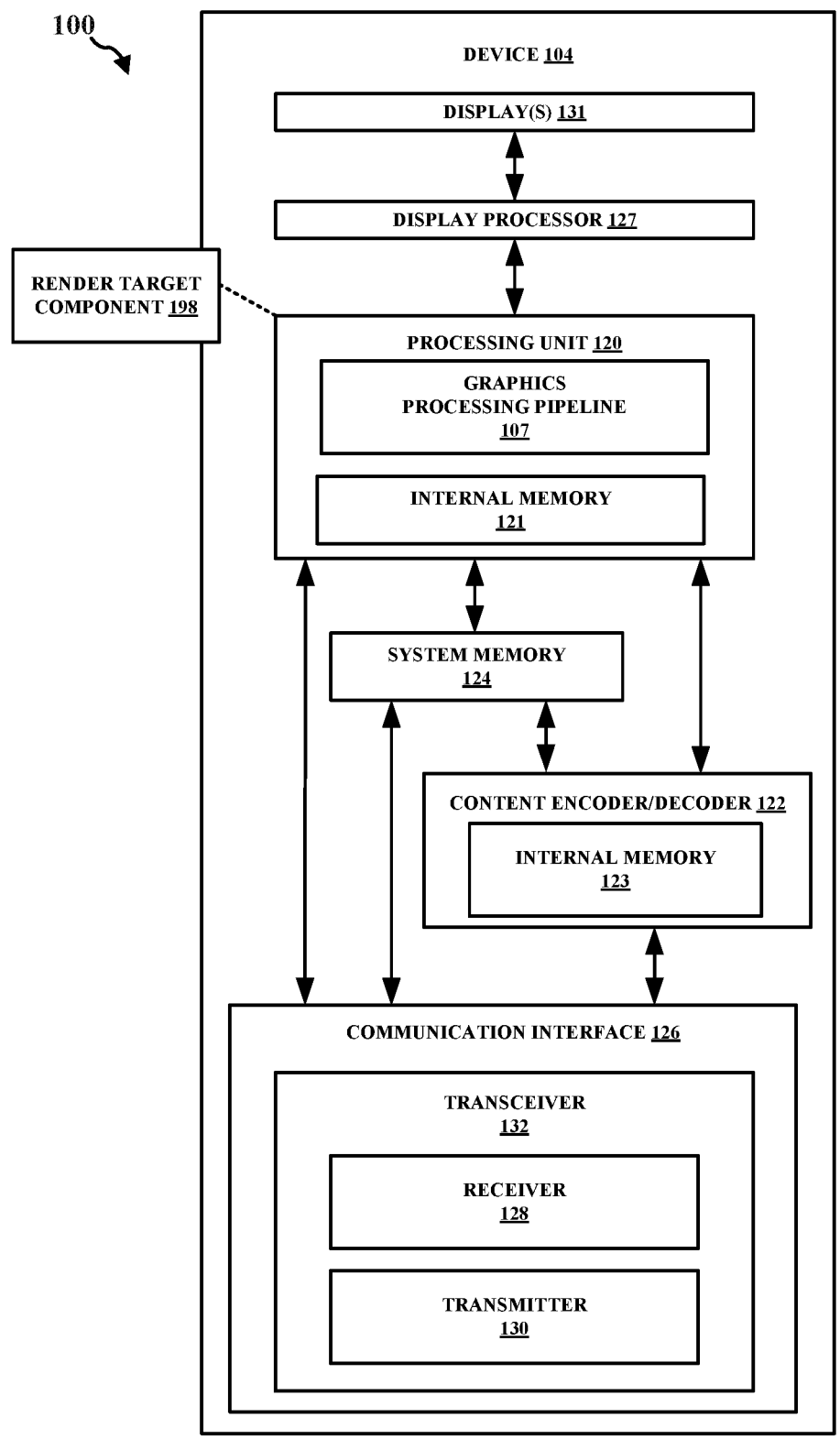
FIG. 1 is a block diagram that illustrates an example content generation system.

Deferred rendering techniques may reduce the number of raw compute cycles by shading a smaller number of fragments compared to forward rendering. For example, in three-dimensional (3D) graphics, deferred rendering may be a popular choice due to its advantage in saving raw compute power compared to forward rendering. However, deferred rendering may come at the expense of multiple render targets (MRTs) and high memory bandwidth. For instance, deferred rendering consumes a high memory bandwidth since render targets (RTs) may need to go through multiple passes for certain types of graphics computations (e.g., the computation of lights and special effects) in order to produce the final image. That is, deferred rendering may utilize render targets, which may be associated with an increased number of certain computations (e.g., the computation of lights and special effects). So deferred rendering may initially render to render targets, thereby saving to the memory, but later the render targets may need to be fetched from the memory. Thus, deferred rendering may utilize an increase number of deferred read and write back instructions later in the pipeline. Indeed, deferred rendering may not raw render instructions initially, but may save render targets to memory and then retrieve them at a later time. So deferred rendering may save immediate bandwidth and performance, but it may result in a deferred bandwidth and performance cost. For instance, any savings in shader instructions due to deferred rendering may come at the cost of higher bandwidth, thus increasing the power in memory sub-systems (e.g., caches, channels, and DDR). Additionally, some RTs are more dominant than others in terms of the number of times they are used in rendering a frame. Hence, some RTs contribute to more memory bandwidth compared to other RTs. Based on the above, it may be beneficial to determine the RTs that contribute to an increased amount of memory bandwidth (e.g., system memory bandwidth). Aspects of the present disclosure may determine the render targets that contribute to an increased amount of memory bandwidth (e.g., system memory bandwidth).

Aspects of the present disclosure may include a number of benefits or advantages. For instance, aspects of the present disclosure may reduce the amount of memory bandwidth utilized by determining the render targets that contribute to more memory bandwidth. In order to do so, aspects of the present disclosure may identify the render targets that contribute to an increased amount of memory bandwidth compared to other render targets. Also, aspects presented herein may reduce the number of read and write operations in deferred rendering due to certain render targets. That is, aspects presented herein may identify the render targets that contribute to an increased number of read and write operations in deferred rendering. Aspects presented herein may also utilize a certain type of memory (e.g., persistent graphics memory) to identify the render targets that contribute to an increased amount of memory bandwidth. Further, aspects presented herein may utilize a certain type of memory (e.g., persistent graphics memory) to identify the render targets that contribute to an increased number of read and write operations.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a render target component 198 configured to obtain an indication of a plurality of render targets (RTs) associated with a rendering process, where each of the plurality of RTs is associated with a subset of a graphics surface for the rendering process. The render target component 198 may also be configured to select at least one RT in the plurality of RTs based on the subset of the graphics surface associated with the at least one RT. The render target component 198 may also be configured to determine whether there is space in the buffer or the cache for storing the at least one RT. The render target component 198 may also be configured to allocate, based on there being space in the buffer or the cache for storing the at least one RT, the subset of the graphics surface associated with the at least one RT to the buffer or the cache. The render target component 198 may also be configured to remove, based on there not being space in the buffer or the cache for storing the at least one RT, a portion of the buffer or the cache in order to allocate the subset of the graphics surface associated with the at least one RT; or determine whether there is an updated command buffer or an updated command list for the subset of the graphics surface associated with the at least one RT. The render target component 198 may also be configured to store the selected at least one RT in a buffer or a cache, or refrain from storing the selected at least one RT in the buffer or the cache. The render target component 198 may also be configured to write, to at least one memory, one or more remaining RTs in the plurality of RTs, where the one or more remaining RTs do not include the selected at least one RT. The render target component 198 may also be configured to output an indication of the selected at least one RT in the plurality of RTs. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
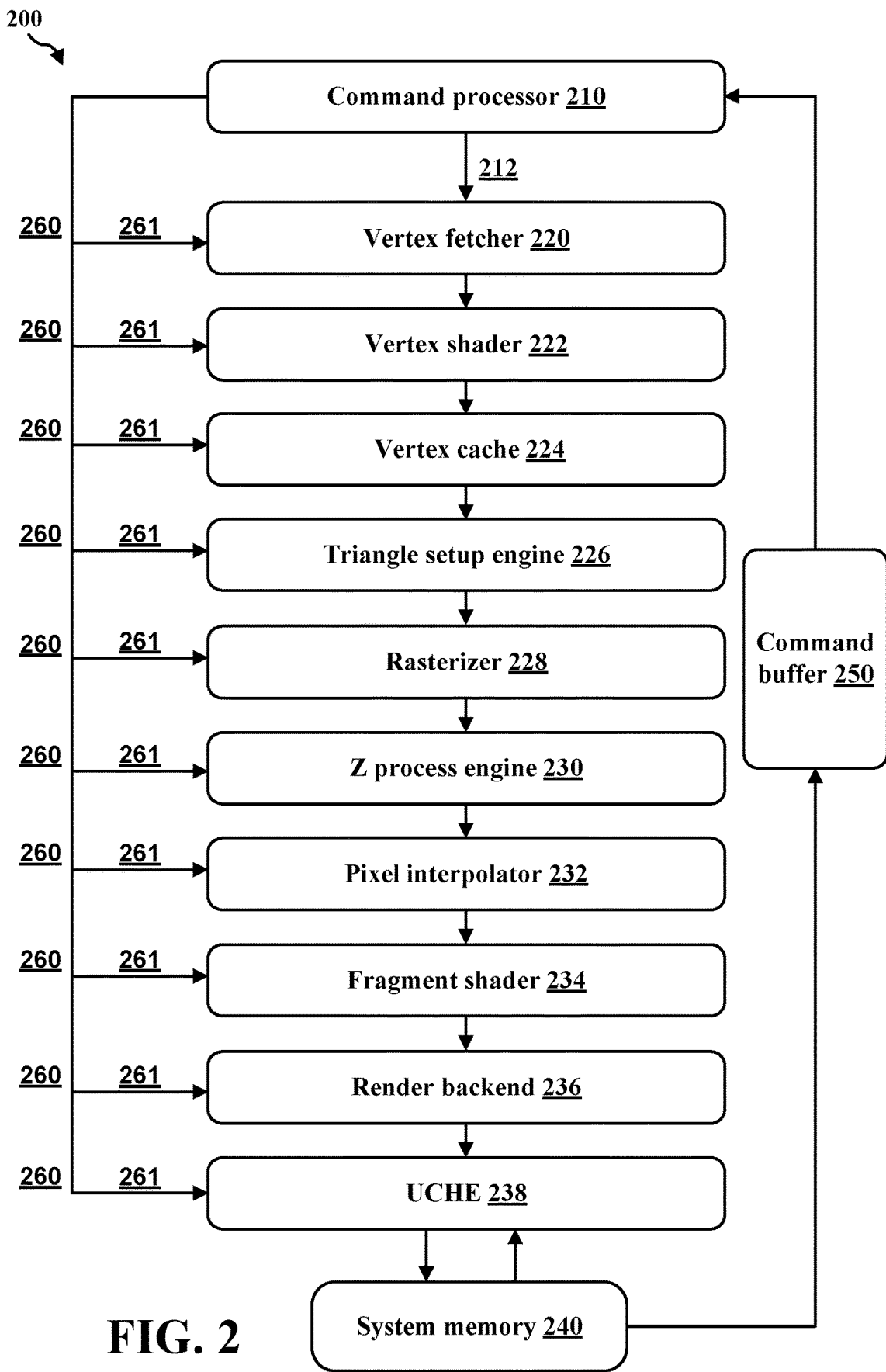
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUS according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In some aspects of tiled rendering, there may be multiple processing phases or passes. For instance, the rendering may be performed in two passes, e.g., a visibility or bin-visibility pass and a rendering or bin-rendering pass. During a visibility pass, a GPU may input a rendering workload, record the positions of the primitives or triangles, and then determine which primitives or triangles fall into which bin or area. In some aspects of a visibility pass, GPUs may also identify or mark the visibility of each primitive or triangle in a visibility stream. During a rendering pass, a GPU may input the visibility stream and process one bin or area at a time. In some aspects, the visibility stream may be analyzed to determine which primitives, or vertices of primitives, are visible or not visible. As such, the primitives, or vertices of primitives, that are visible may be processed. By doing so, GPUs may reduce the unnecessary workload of processing or rendering primitives or triangles that are not visible. In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each of the primitives in each bin or area, e.g., in a system memory. This visibility information may be used to determine or generate a visibility stream. In a rendering pass, the primitives in each bin may be rendered separately. In these instances, the visibility stream may be fetched from memory used to drop primitives which are not visible for that bin.

Some aspects of GPUs or GPU architectures may provide a number of different options for rendering, e.g., software rendering and hardware rendering. In software rendering, a driver or CPU may replicate an entire frame geometry by processing each view one time. Additionally, some different states may be changed depending on the view. As such, in software rendering, the software may replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware may manage the replication or processing of the primitives or triangles for each viewpoint in an image.

Figure 3:
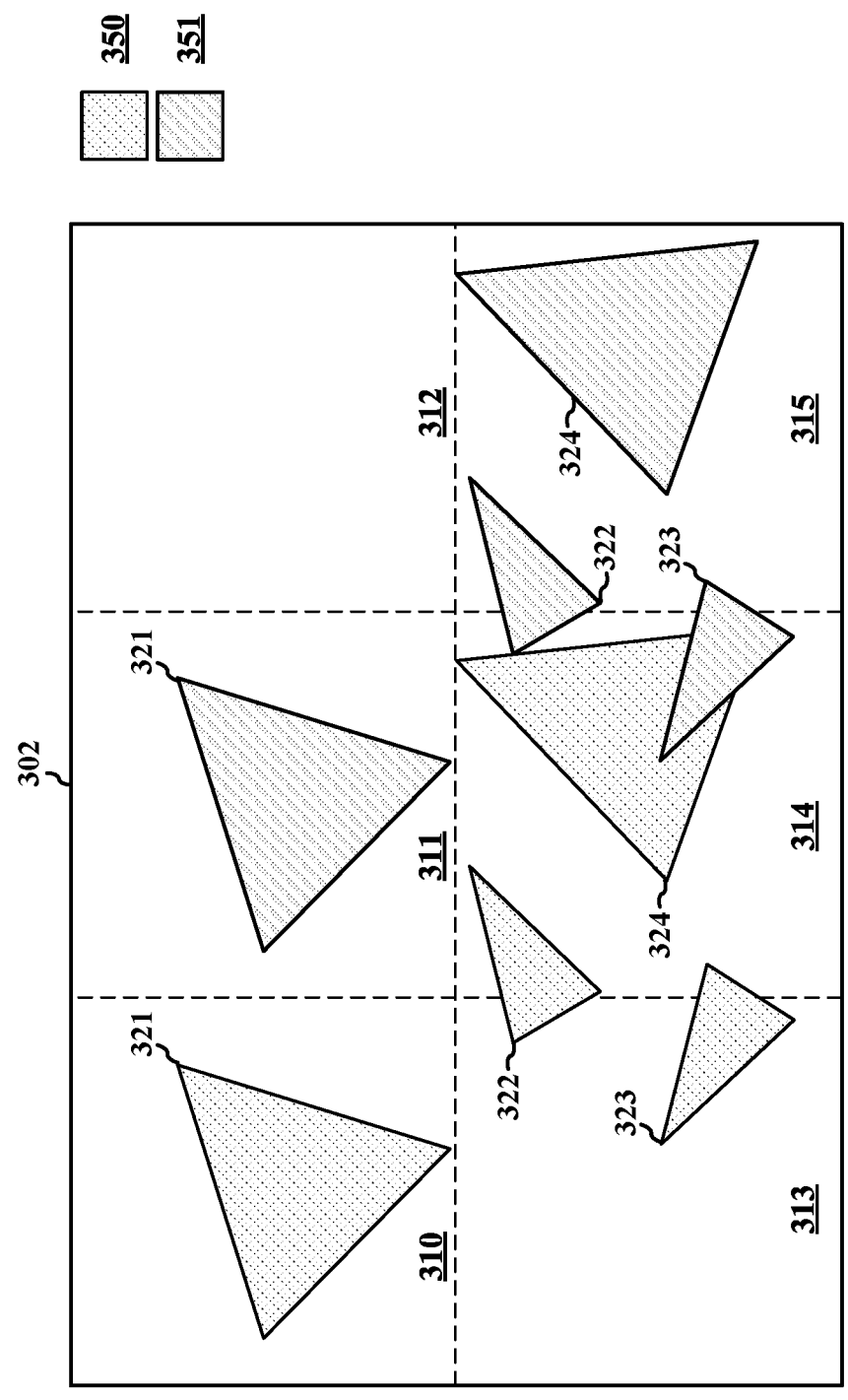
FIG. 3 is a diagram illustrating an example image or surface for graphics processing.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 may utilize multiple viewpoints or multi-view rendering.

As indicated herein, GPUs or graphics processor units may use a tiled rendering architecture to reduce power consumption or save memory bandwidth. As further stated above, this rendering method may divide the scene into multiple bins, as well as include a visibility pass that identifies the triangles that are visible in each bin. Thus, in tiled rendering, a full screen may be divided into multiple bins or tiles. The scene may then be rendered multiple times, e.g., one or more times for each bin. In aspects of graphics rendering, some graphics applications may render to a single target, i.e., a render target, one or more times. For instance, in graphics rendering, a frame buffer on a system memory may be updated multiple times. The frame buffer may be a portion of memory or random access memory (RAM), e.g., containing a bitmap or storage, to help store display data for a GPU. The frame buffer may also be a memory buffer containing a complete frame of data. Additionally, the frame buffer may be a logic buffer. In some aspects, updating the frame buffer may be performed in bin or tile rendering, where, as discussed above, a surface is divided into multiple bins or tiles and then each bin or tile may be separately rendered. Further, in tiled rendering, the frame buffer may be partitioned into multiple bins or tiles.

Additionally, graphics applications may build or include multiple buffers, e.g., a depth buffer and/or a color buffer with a diffuse color. Also, graphics applications may build or include shadow maps, e.g., for light at the depth or color buffers. For instance, applications may run a renderer on one buffer, e.g., for a diffuse color, and then move to another buffer, e.g., to create a shadow for a different light. Graphics applications may also combine other information with pre-viously saved information at buffers, e.g., a specular color and/or shadows on a previous color buffer. As indicated herein, in bin or tiled rendering architecture, frame buffers may have data stored or written to them repeatedly, e.g., when rendering from different types of memory. This may be referred to as resolving and unresolving the frame buffer or system memory. For example, when storing or writing to one frame buffer and then switching to another frame buffer, the data or information on the frame buffer may be resolved from the GPU internal memory (GMEM) at the GPU to the system memory, i.e., memory in the double data rate (DDR) RAM or dynamic RAM (DRAM).

In some aspects, the system memory may also be system-on-chip (SoC) memory or another chip-based memory to store data or information, e.g., on a device or smart phone. The system memory may also be physical data storage that is shared by the CPU and/or the GPU. In some instances, the system memory may be a DRAM chip, e.g., on a device or smart phone. Accordingly, SoC memory may be a chip-based manner in which to store data. In some aspects, the GMEM may be on-chip memory at the GPU, which may be implemented by static RAM (SRAM). Additionally, GMEM may be stored on a device, e.g., a smart phone. As indicated herein, data or information may be transferred between the system memory or DRAM and the GMEM, e.g., at a device. In some aspects, the system memory or DRAM may be at the CPU or GPU. Additionally, data may be stored at the DDR or DRAM. In bin or tiled rendering, a small portion of the memory may be stored at the GPU, e.g., at the GMEM. In some instances, storing data at the GMEM may utilize a larger processing workload and/or power consumed com-pared to storing data at the frame buffer or system memory.

As indicated herein, in bin or tiled rendering, there may be different types of memory storage, e.g., system or SoC memory and GMEM or on-chip memory, to store different data or information, e.g., the color or depth for a particular tile. In some aspects, the rendering data for each tile or bin may be transferred during an unresolve or resolve process. During the unresolve process, data or information may be moved from the system memory to the GMEM. Likewise, during the resolve process, data or information may be moved from the GMEM to the system memory. This process may then be repeated for the next bin or tile. In some aspects, GMEM or on-chip memory may have a limited data size. Accordingly, the process of transferring rendered informa-tion from the GMEM to the system memory or frame buffer may be performed on a tile-by-tile basis. For example, the GMEM may have a size to store colors of 256×256 pixels, which may correspond to the size of a tile. A frame buffer or system memory may have a larger data size compared to the size of the GMEM, e.g., may store colors of 1920×1080 pixels. In some aspects, when partitioning a frame buffer, e.g., 1920×1080 pixels, this may be performed in multiple steps based on the size of each tile, e.g., 256×256 pixels.

As mentioned above, when storing or writing data or information to the system memory or frame buffer, a tile or bin may be unresolved when moving data or information from the system memory to the GMEM. Also, a tile or bin may be resolved when moving data or information from the GMEM to the system memory. For example, the resolving process may transfer data or information the size of a tile, e.g., 256×256 pixels, to the system memory. Aspects of the present disclosure may then move to another tile and con-tinue the unresolve/resolve process, such as by unresolving the tile from the system memory to GMEM, rendering the tile, and then resolving the tile from the GMEM to the system memory. This process may continue until the entire frame buffer is filled. As indicated herein, data for each tile may be moved from the system memory to the GMEM, i.e., the unresolve process, and then after rendering the data may be moved from the GMEM back to the system memory, i.e., the resolve process. Thus, the unresolve process may be an inverse movement of data compared to the resolve process. This unresolve/resolve process may be performed because the GPU memory or GMEM may be able to store less information compared to the system memory. So once rendered, tile data may be moved from the GMEM back to the frame buffer and stored on the system memory. As such, the rendered data for a tile may be transferred to the frame buffer on the system memory. Also, in some aspects, during the unresolve process, data stored at the frame buffer may be transferred to the GMEM when it is needed to render a tile at the GPU. Accordingly, a portion of the frame buffer data may be transferred from the system memory to the GMEM, and after rendering based on this data, the data may be transferred back to the frame buffer at the system memory. This process may be performed for each bin or tile until the entire surface is finished rendering.

Additionally, in some aspects, each tile may be rendered multiple rendering times, such that a portion of a tile is rendered. Accordingly, rendering data may be transferred multiple times back and forth between the system memory and the GMEM during the unresolve/resolve process. For example, GPUs may render one aspect of a surface or tile, e.g., a background, and this data may be stored at the system memory while other aspects of the surface or tile are rendered. This data may then be transferred back to the GPU when rendering another part of a scene, e.g., a character. This process may also be referred to as rendering in multiple paths. Further, GPUs may render different aspects of a scene at different times. For example, the diffuse color of a scene may be rendered, then the spectral color, and then the shadows. So a frame buffer may store data incrementally when the tile or bin is rendered in multiple paths. Also, during the process of rendering each bin or tile, data may be transferred back and forth between the system memory and the GPU memory multiple times.

In certain types of GPUS (e.g., bin rendering GPUs), switching back to a previous rendered surface may involve a number of different operations for each bin. For example, certain data, e.g., color and depth data, for a bin may be moved from a buffer, e.g., a color and depth buffer in the system memory, to GPU internal memory for color and depth. As mentioned above, this process may be referred to as an unresolve process. The bin or tile may then be rendered based on the data, e.g., color and depth data. The data, e.g., color and depth data, may then be moved from GPU internal memory for color and depth to a buffer, e.g., color and depth buffer, in the system memory. As mentioned above, this process may be referred to as a resolve process. In some instances, when unresolving a tile or bin, the entire tile may be transferred from the system memory to the GMEM prior to rendering the tile. After rendering, the entire tile may be resolved from the GMEM to the system memory. So when transferring certain data for a tile in order to render the tile, e.g., to and/or from the system memory and the GMEM, the data for the entire tile may be transferred. As indicated herein, it may take both GPU power and performance in order to transfer data from the system memory to the GMEM, and vice versa, for the unresolve and resolve processes.

Figure 4:
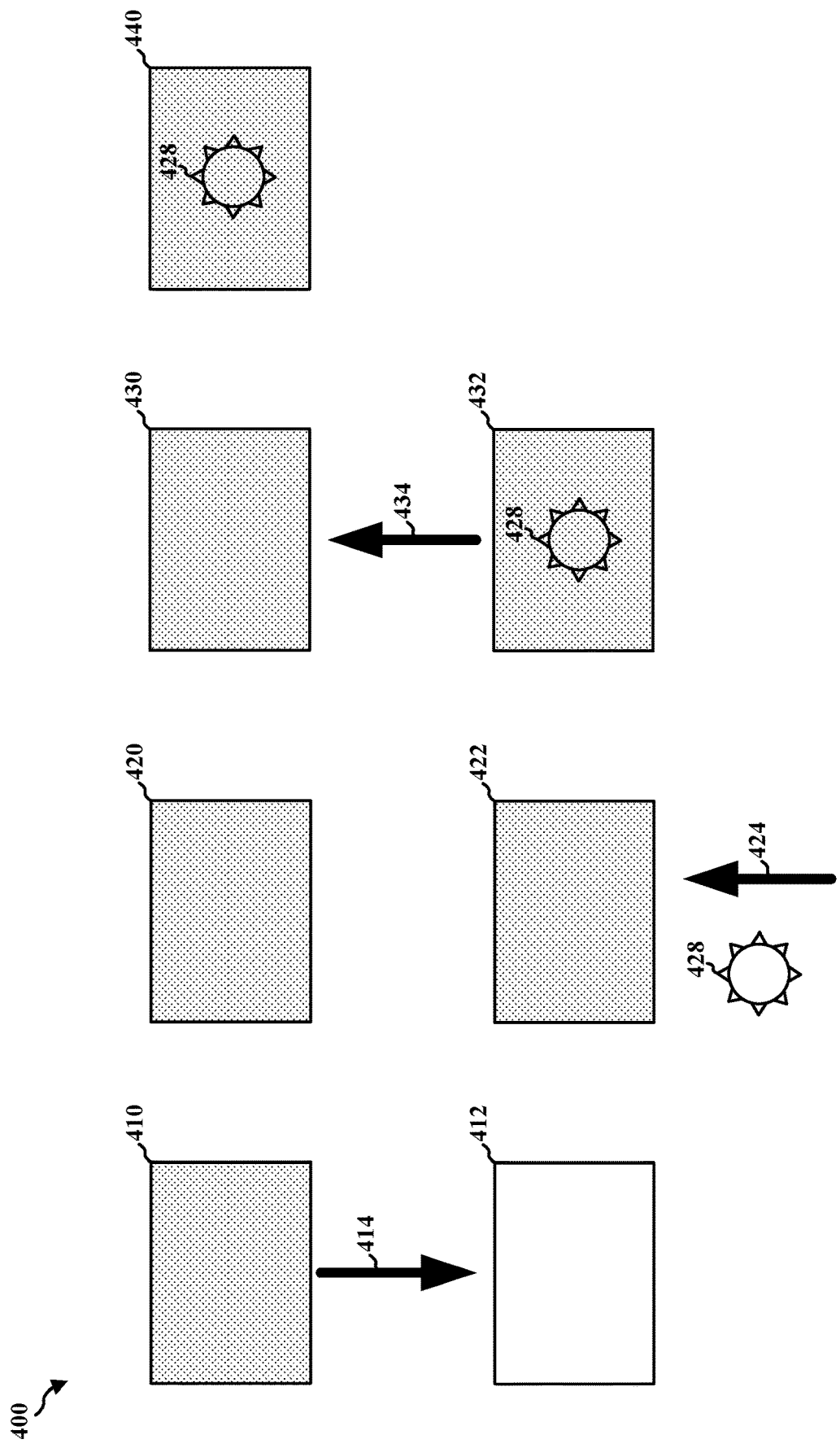
FIG. 4 is a diagram illustrating a system memory and a graphic memory.

FIG. 4 illustrates an example diagram 400 including a system memory and a GMEM in accordance with one or more techniques of this disclosure. As shown in FIG. 4, diagram 400 includes system memory 410, system memory 420, system memory 430, system memory 440, GMEM 412, GMEM 422, GMEM 432, display content 428, unresolve process 414, rendering 424, resolve process 434. The system memory at 410/420/430/440 may represent the system memory at a GPU or CPU during different times of the unresolve/resolve process. The GMEM 412/422/432 may represent the GMEM at a GPU during different times of the unresolve/resolve process.

As shown in FIG. 4, during unresolve process 414, data or information for a tile may be moved from system memory 410 to GMEM 412. During rendering 424, the display content 428, e.g., a sun, may be rendered for the tile. After rendering, the data or information for the display content 428 may be written or stored to the GMEM 422. After the data or information for the display content 428 has been copied and/or stored at the GMEM 432, the data or information for the display content 428 may be moved from the GMEM 432 to the system memory 430 during the resolve process 434. The data or information for the display content 428 may then be copied or stored to the system memory 440. FIG. 4 displays that in some aspects, a portion of the tile may be updated, e.g., the sun, but the data for the entire tile may be transferred from the system memory to the GMEM and back. By transferring the data for the entire tile, this may waste a lot of memory bandwidth. As a certain portion of the tile is rendered, the entire area of the tile is not rendered. This may also apply to certain rendering operations, e.g., when rendering color and depth memory. In some aspects, during bin rendering, a significant portion of the data or information for a bin or tile may not be written or updated after rendering. For example, portions of the GMEM may not need to be updated when rendering. As shown in FIG. 4, the sun is being rendered at 424, so other portions of the bin or tile may not need rendering.

Aspects of graphics processing may utilize a number of different rendering techniques. For example, forward rendering is a rendering technique that sends each geometry through the graphics pipeline one at a time in order to produce a final image. Forward rendering is a standard rendering technique that is utilized my most graphics engines. In forward rendering, the geometry is supplied, it is broken down into vertices, and then those vertices are transformed and split into fragments or pixels. These fragments or pixels then get the final rendering treatment before they are sent to the display. In deferred rendering, the rendering is deferred until all of the geometries have been sent through the graphics pipeline. The final image is then produced by applying shading at the end after all of the geometries have been sent through the graphics pipeline. That is, the final rendering is deferred until all of the geometries have been sent.

Aspects of graphics processing may also utilize a render target (RT), which allows a graphics scene to be rendered to an intermediate location (e.g., an intermediate memory or buffer), rather than a frame buffer. That is, in graphics processing, a render target is an area of memory (e.g., graphics memory or computer memory) in which the next frame to be displayed is drawn. For example, in three-dimensional (3D) computer graphics, a render target may be a feature of graphics processing units (GPUs) that allows a 3D scene to be rendered to an intermediate memory buffer (e.g., a render target texture (RTT)). That is, the scene may be rendered to the intermediate memory buffer, rather than a frame buffer or back buffer. In some aspects, the intermediate memory buffer or render target texture may be manipulated by certain shaders (e.g., pixel shaders) in order to apply additional effects to the final image prior to its display.

A render target may be in an area of dedicated memory on the graphics card or the graphics processing unit (GPU). A render target may be used to increase the rendering speed at the GPU. Additionally, a render target may be referred to as a back buffer, a framebuffer object, or a double buffer. In three-dimensional (3D) computer graphics, a render target may be used to draw textures onto objects in order to help optimize the final display image (e.g., when the image is compiled). In some aspects of graphics processing, there may be multiple render targets (MRTs), where different parts of a frame may be drawn on different surfaces and then composited onto the final target. A render target may be similar to the process of double buffering. For example, an image may be drawn onto an off-screen surface (i.e., an area of memory), so that when the next frame is to be drawn to a display or screen, it may be done quickly as all of the drawing functions have already been performed. With render target, the area of memory utilized may be on a graphics card and managed through hardware or other aspects of the GPU, which allows a render target to be both fast and efficient. A render target may also be used to optimize the rendering of objects that use images for surface textures. In some aspects, the render context may be inside the graphics hardware, which may allow for a fast rasterization of graphics objects.

In forward rendering, certain types of calculations (e.g., lighting calculations) may be performed on every vertex and every fragment for all light in a visible scene. In some instances, an increase in light in the scene and/or special effects in the scene may result in an increase in the number of computations associated with the scene. For instance, the number of computations may correspond to the instructions to be executed for pixels in the GPU. The rendering complexity may be proportional to the number of fragment shader instructions, the number of fragments, and the number of effective lights. In big O notation, the rendering complexity may be written as: O(number_of_fragment_shader_instruction*number_of_fragments*number_of_effective_lights). That is, the rendering complexity may be directly proportional to the number of fragments being shaded before a final depth test and the number of lights in the scene. In some aspects, modern graphics may demand more dynamic lights for better realism in applications/games and in the virtual world.

In deferred rendering, certain types of calculations (e.g., lighting calculations) may be performed on the pixels visible on the screen, thereby reducing the total fragment count to be shaded for lights. Ideally the number of fragments shaded may be equal to the resolution size instead of the total fragment count. The rendering complexity may be proportional to the number of fragment shader instructions, the screen resolution, and the number of effective lights. In big O notation, the complexity of deferred rendering may be expressed as O(number_of_fragment_shader_instruction*screen resolution*number_of_effective_lights). The savings in the number of fragments to be shaded may be directly related to the savings in the raw compute cycles. As such, deferred rendering benefits both power and performance. Those render targets (RTs) may need to go through multiple passes for the computation of lights and special effects in order to produce the final image.

As indicated above, deferred rendering techniques may reduce the number of raw compute cycles by shading a smaller number of fragments compared to forward rendering. For example, in 3D graphics, deferred rendering may be a popular choice due to its advantage in saving raw compute power compared to forward rendering. However, deferred rendering may come at the expense of multiple render targets (MRTs) and high memory bandwidth. For instance, deferred rendering consumes a high memory bandwidth since render targets (RTs) may need to go through multiple passes for certain types of graphics computations (e.g., the computation of lights and special effects) in order to produce the final image. That is, deferred rendering may utilize render targets, which may be associated with an increased number of certain computations (e.g., the computation of lights and special effects). So deferred rendering may initially render to render targets, thereby saving to the memory, but later the render targets may need to be fetched from the memory. Thus, deferred rendering may utilize an increase number of deferred read and write back instructions later in the pipeline. Indeed, deferred rendering may not render instructions initially, but may save render targets to memory and then retrieve them at a later time.

So deferred rendering may save immediate bandwidth and performance, but it may result in a deferred bandwidth and performance cost. For instance, any savings in shader instructions due to deferred rendering may come at the cost of higher bandwidth, thus increasing the power in memory sub-systems (e.g., caches, channels, and DDR). Additionally, some RTs are more dominant than others in terms of the number of times they are used in rendering a frame. Hence, some RTs contribute to more memory bandwidth compared to other RTs. Based on the above, it may be beneficial to determine the RTs that contribute to an increased amount of memory bandwidth (e.g., system memory bandwidth). That is, it may also be beneficial to reduce the amount of memory bandwidth utilized by determining the render targets that contribute to more memory bandwidth. Also, it may also be beneficial to reduce the number of read and write operations in deferred rendering due to certain render targets.

Aspects of the present disclosure may determine the render targets that contribute to an increased amount of memory bandwidth (e.g., system memory bandwidth). For instance, aspects of the present disclosure may reduce the amount of memory bandwidth utilized by determining the render targets that contribute to more memory bandwidth. In order to do so, aspects of the present disclosure may identify the render targets that contribute to an increased amount of memory bandwidth compared to other render targets. Additionally, aspects presented herein may reduce the number of read and write operations in deferred rendering due to certain render targets. That is, aspects presented herein may identify the render targets that contribute to an increased number of read and write operations in deferred rendering. Aspects presented herein may utilize a certain type of memory (e.g., persistent graphics memory) to identify the render targets that contribute to an increased amount of memory bandwidth. Moreover, aspects presented herein may utilize a certain type of memory (e.g., persistent graphics memory) to identify the render targets that contribute to an increased number of read and write operations.

In some instances, aspects presented herein may identify and select the render targets that contribute to an increased amount of system memory traffic or contribute the most to the system memory traffic. Aspects presented herein may then store the selected render targets in a local buffer to be used multiple times (i.e., persistently used) in a scene or frame. Thus, aspects presented herein may significantly reduce the amount of system memory traffic, which may improve performance at a GPU and/or reduce the amount of power utilized at the GPU. For instance, GPUs herein may introduce a local buffer (e.g., a persistent graphics memory (pGMEM)) to store the memory traffic inside GPU, thereby significantly reducing the traffic over channels and DDR. By doing so, aspects presented herein may provide a performance uplift and power savings at the GPU. The uplift in performance may be due to both a lower read-write latency and a lower effective bandwidth. Also, the savings in bandwidth may be directly correlated to power savings in system-on-chips (SoCs), such as SoC including a different thermal design point. Accordingly, aspects presented herein may yield a competitive advantage for GPUs in both sustained performance and power.

Aspects presented herein relate to rendering and the corresponding high memory bandwidth, as render targets (RTs) may need to go through multiple passes for certain computations (e.g., the computation of lights and special effects) in order to produce the final image. That is, aspects presented herein may take the advantage of the fact that a render target may go through multiple passes, thus making multiple round trips between the graphics processing unit (GPU) and a system memory (SysMem). To achieve this both the hardware and software may work in tandem. At first, a local buffer (e.g., persistent graphics memory (pG- MEM)) may be introduced, which may be big enough to hold at least one RT of the multiple RTs (MRTs). Aspects presented herein may utilize an algorithm to select the RTs that may yield the best possible savings in memory bandwidth. The candidate surfaces may then be allocated to the pGMEM and used as both RTs (e.g., write) and as texture surfaces (e.g., read) when needed. The algorithm may also direct the driver when to reclaim the pGMEM space for the next best candidate RTs. By doing so, this may result in a competitive advantage for GPUs in sustained performance and/or power.

Figure 5A:
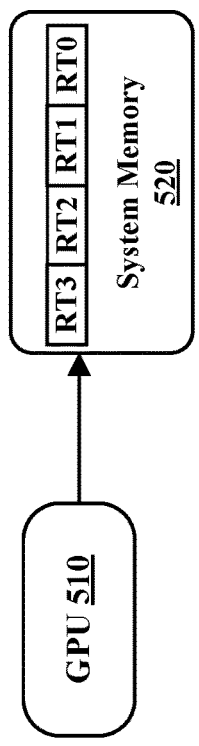
FIG. 5A is a diagram illustrating an example rendering approach.
Figure 5B:
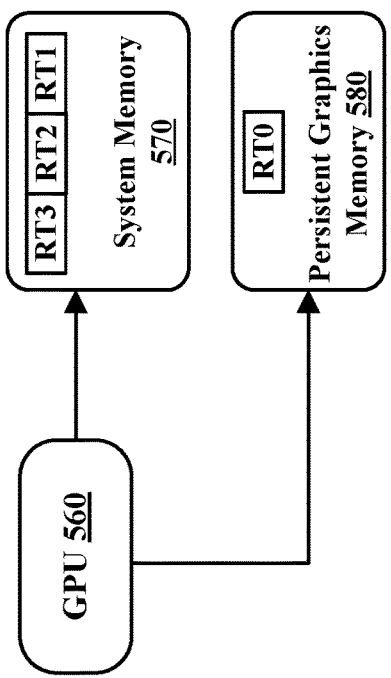
FIG. 5B is a diagram illustrating an example rendering approach.

FIG. 5A and FIG. 5B illustrate diagram 500 and diagram 550, respectively, including examples of rendering approaches. Diagram 500 in FIG. 5A depicts a rendering approach 502 with multiple render targets (MRTs). As shown in FIG. 5A, diagram 500 includes GPU 510 and system memory 520 including multiple render targets (e.g., RT0, RT1, RT2, and RT3). FIG. 5A depicts that the multiple render targets (e.g., RT0, RT1, RT2, and RT3) are all stored in the system memory 520. Diagram 550 in FIG. 5B depicts a rendering approach 552 with MRTs including a persistent graphics memory. As shown in FIG. 5B, diagram 550 includes GPU 560, system memory 570 including multiple render targets (e.g., RT1, RT2, and RT3), and persistent graphics memory 580 including a render target (e.g., RT0). FIG. 5B depicts that some of the multiple render targets (e.g., RT1, RT2, and RT3) are stored in the system memory 570 and at least one render target (e.g., RT0) is stored in the persistent graphics memory 580. Diagram 550 shows that aspects presented herein may select a render target (e.g., RT0) and move it to the persistent graphics memory 580. Once the RT is stored in the persistent graphics memory 580, software may control this RT. The software may hold the RT for multiple uses and release it at the appropriate time. For example, the software may determine that it can evict the RT and replace it with a better performing candidate RT. As shown in FIG. 5B, aspects presented herein may determine which render target to save in graphics memory (e.g., persistent graphics memory 580) and/or which render target is going to be the most persistently used in graphics memory.

In some aspects, the traffic contribution from multiple passes of a render target may be a post shading effect. Also, the driver may not be able to determine how to select the best RTs. However, a driver may receive hints on how to select the best RTs, such as while processing commands to be submitted to the command buffer of the GPU. For instance, just before the submission of commands, the driver may scan the command buffer (CB) for each submit queue (SubmitQ) instruction and/or command queue (CmdQ) instruction. Also, the driver may try to select the best possible surfaces to be allocated by constructing a dependency graph (DAG). For certain application program interfaces (APIs) (e.g., bindless graphics APIs), the driver may consider the number of times a surface is referenced (RefCnt) in the frame by exploiting the changes in a resource barrier (RB) or through some surface reference counters from the GPU hardware. The drive may even exploit both the RB and the RefCnt for an improved accuracy and confidence in the selected surfaces. In the case of the resource barrier, the driver may exploit the changes of the view of a surface during the change of the barrier. The reference count of a surface may come from multiple sources, and one approach is to obtain the reference counts from the previous frame. In case of APIs like open graphics library (OpenGL), the surface may not be bindless and the driver may have a complete knowledge of the surface's binding information for each stage of the pipeline. As such, for APIs like OpenGL, the driver may be able to build the dependency graph for the entire frame without the need for any feedback (e.g., feedback in terms of counters) from the GPU hardware.

Additionally, aspects presented herein may include an algorithm that considers a number of factors, such as the resolution of the surfaces, blend information, the type of surface (e.g., color, depth, normal, light etc.) and any other heuristics that might be associated with the memory traffic contribution. Among surfaces with similar reference counts, the higher resolution surfaces may tend to produce an increased amount of memory traffic. In some instances, if a surface is going to be blended, the surface may generate both read and write traffic to the system memory. Also, certain types of surfaces (e.g., a color surface) may produce more traffic than depth or normal surfaces of a same resolution and bits-per-pixel (bpp). These heuristics (e.g., heuristics coupled with the reference counts) may be the input to the surface selection algorithm and/or may help to select the candidate surfaces to be included in the persistent graphics memory (pGMEM).

Figure 6:
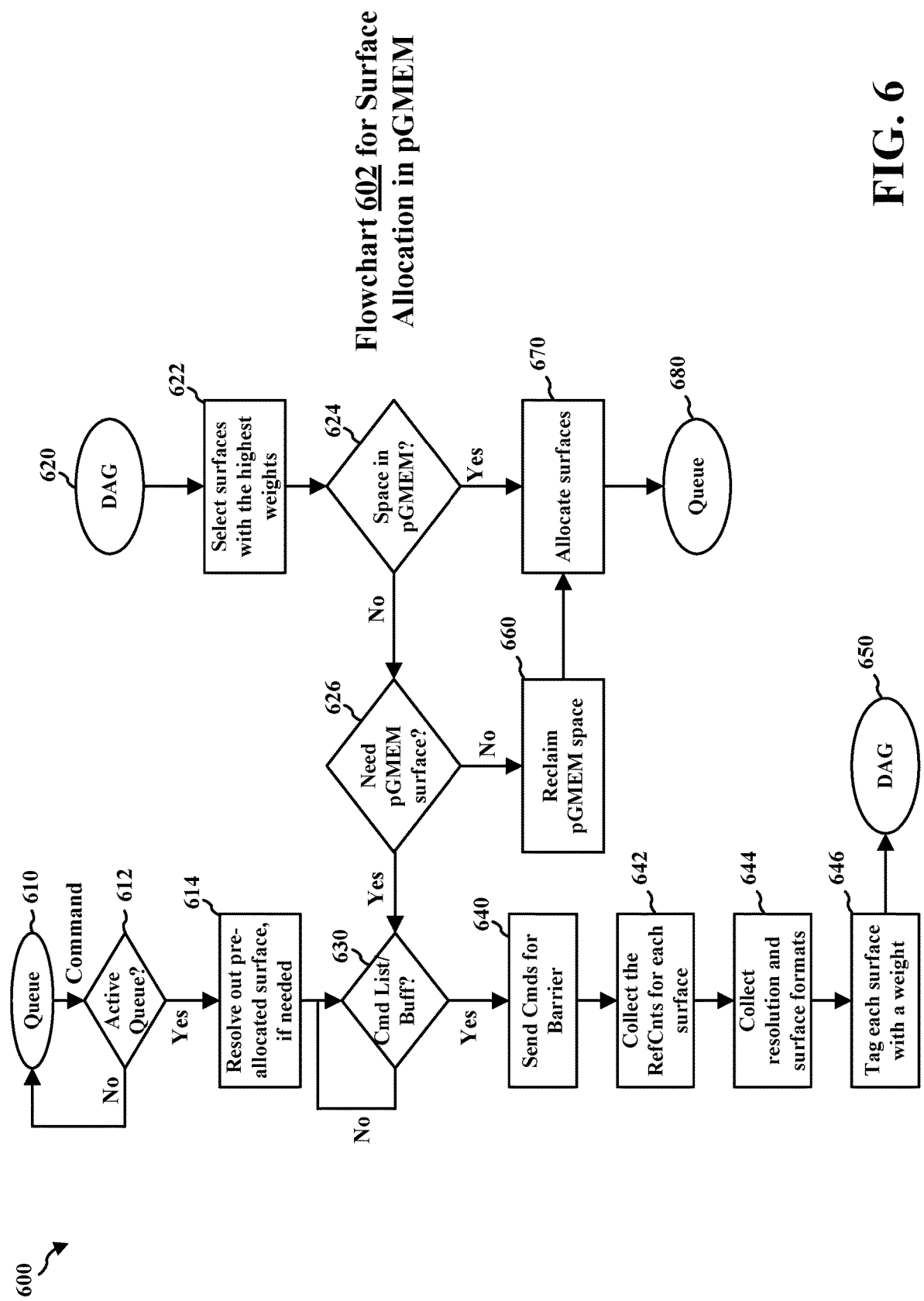
FIG. 6 is a diagram illustrating an example flowchart for a render target selection algorithm.

FIG. 6 illustrates diagram 600 including one example of a render target selection algorithm. More specifically, diagram 600 depicts a flowchart 602 for a surface allocation in a persistent graphics memory (pGMEM). As shown in FIG. 6, diagram 600 includes a number of steps for the surface allocation in the pGMEM. FIG. 6 also depicts that a driver can take the hints while processing the commands to be submitted to the command buffer of the GPU. A command buffer or a command list may be a buffer that stores instructions or commands at a GPU. For example, a command buffer or a command list may be a placeholder to record commands for drawing and resource management. A command queue and submit queue may be the queue in the GPU to hold one or more command lists/buffers. A resource barrier or memory barrier may be a synchronization command to manage the accesses to the memory where a surface lies. A surface may be declared as a read/write surface or as a read-write one. A barrier may be used the change the state of the surfaces that are accessed via GPU commands. Further, FIG. 6 depicts that there may be a number of input parameters to the render target selection. For example, the input parameters to the render target selection may include surface resolution, surface type, blend, resource barrier, and/or surface reference count.

As shown in FIG. 6, at 610, the algorithm may wait for an instruction of a submit (e.g., a submit queue (Queue) instruction). At 612, the algorithm may determine whether the command is inside an active submit queue (Queue). If no at 612, the algorithm goes back to step 610. If yes at 612, at 614, the algorithm may resolve out a pre-allocated surface, if needed. If yes at 626, at 630, the algorithm may determine whether there is a command list/buffer (CmdL/B) instruction. If yes at 630, at 640, the algorithm may search commands (Cmds) for a barrier. At 642, the algorithm may collect the reference counts (RefCnts) for each surface. At 644, the algorithm may collect the resolution and surface properties (e.g., format, type, etc.). At 646, the algorithm may tag each surface with a weight. At 650, the algorithm may output a dependency graph (DAG). At 620, the algorithm may input a dependency graph (DAG). At 622, the algorithm may select a surface with the highest weights. At 624, the algorithm may determine when there is space in the pGMEM. If no at 624, at 626, the algorithm may determine if there is a need for a pGMEM surface. If no at 626, at 660, the algorithm may reclaim pGMEM space before allocating surfaces at 670. If yes at 624, the algorithm may allocate surfaces at 670. At 680, the algorithm may wait for an instruction of a new submit queue (Queue).

FIG. 7A and FIG. 7B illustrate diagram 700 and diagram 750, respectively, including examples of rendering approaches. Diagram 700 in FIG. 7A depicts a bin rendering approach 702 with multiple render targets (MRTs). As shown in FIG. 7A, diagram 700 includes shader core 710, local GMEM 720 including multiple render targets (e.g., RT0, RT1, RT2, and RT3), and system memory 730 including multiple render targets (e.g., RT0, RT1, RT2, and RT3). FIG. 7A depicts that the multiple render targets (e.g., RT0, RT1, RT2, and RT3) are all stored in the local GMEM 720 and the system memory 730. Diagram 750 in FIG. 7B depicts a direct rendering approach 752 with MRTs. As shown in FIG. 7B, diagram 750 includes shader core 760 and system memory 770 including multiple render targets (e.g., RT0, RT1, RT2, and RT3). FIG. 7B depicts that the multiple render targets (e.g., RT0, RT1, RT2, and RT3) are all stored in the system memory 770. FIG. 7A and FIG. 7B illustrate that, in case of MRTs, at least one or more surfaces (e.g., four in deferred rendering) may be rendered in one render pass (RP), with a collection of draw calls with similar rendering objective. In the bin rendering approach 702 in FIG. 7A, all the RTs in a MRT pass may be rendered to local GMEM 720 (e.g., bGMEM). As shown in FIG. 7B, in the direct rendering approach 752, the RTs are rendered directly to system memory 770.

In order to allocate one or more surfaces to a pGMEM, aspects presented herein may utilize a rendering technique referred to as hybrid rendering (HR). In hybrid rendering, aspects presented herein may allocate one or more surfaces to a pGMEM, but not all surfaces of the MRTs. In the hybrid rendering according to the present disclosure, RTs may reside either in pGMEM or sysMem. Also, in hybrid rendering, the software may have complete control over the residency of the RTs. Moreover, based on the available space in a pGMEM, the driver may allocate at least one and more surfaces to pGMEM, and the driver may allocate the rest of the surfaces to the system memory (sysMEM).

Figure 8A:
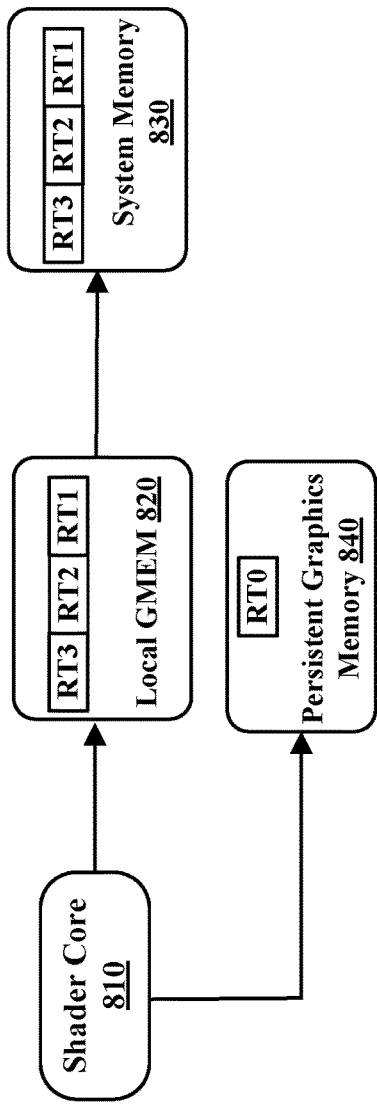
FIG. 8A is a diagram illustrating an example rendering approach.
Figure 8B:
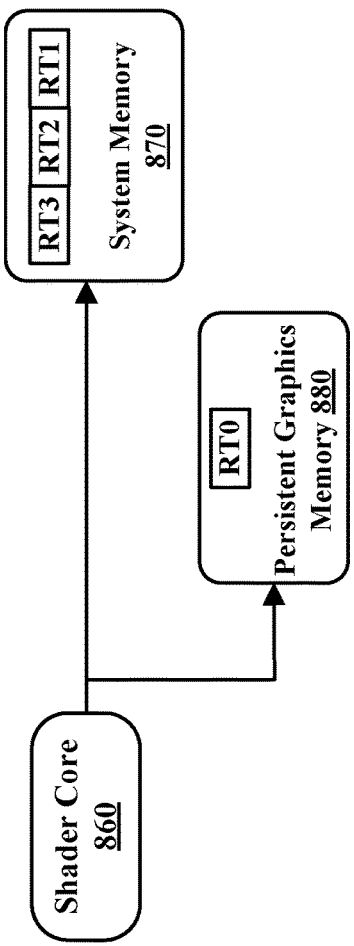
FIG. 8B is a diagram illustrating an example rendering approach.

FIG. 8A and FIG. 8B illustrate diagram 800 and diagram 850, respectively, including examples of rendering approaches. Diagram 800 in FIG. 8A depicts a hybrid bin rendering approach 802 with multiple render targets (MRTs). As shown in FIG. 8A, diagram 800 includes shader core 810, local memory 820 including multiple render targets (e.g., RT1, RT2, and RT3), system memory 830 including multiple render targets (e.g., RT1, RT2, and RT3), and persistent graphics memory 840 including a render target (e.g., RT0). FIG. 8A depicts that some of the multiple render targets (e.g., RT1, RT2, and RT3) are stored in the local memory 820 and the system memory 830, and at least one render target (e.g., RT0) is stored in the persistent graphics memory 840. Diagram 800 shows that aspects presented herein may select a render target (e.g., RT0) and move it to the persistent graphics memory 840. As shown in FIG. 8A, in case of hybrid rendering with bin mode, the RT0 may be directly rendered to persistent graphics memory 840 and other three RTs (RT1, RT2, RT3) may be rendered to the local memory 820 and later resolved (i.e., written back) to system memory 830. Once the RT is stored in the persistent graphics memory 840, software may control this RT. Also, the software may hold the RT for multiple uses and release it at the appropriate time. For example, the software may determine that it can evict the RT and replace it with a better performing candidate RT. As shown in FIG. 8A, aspects presented herein may determine which render target to save in graphics memory (e.g., persistent graphics memory 840).

Diagram 850 in FIG. 8B depicts a hybrid direct rendering approach 852 with MRTs. As shown in FIG. 8B, diagram 850 includes shader core 860, system memory 870 including multiple render targets (e.g., RT1, RT2, and RT3) and persistent graphics memory 880 including a render target (e.g., RT0). FIG. 8B depicts that some of the multiple render targets (e.g., RT1, RT2, and RT3) are stored in the system memory 870, and at least one render target (e.g., RT0) is stored in the persistent graphics memory 880. Diagram 850 shows that aspects presented herein may select a render target (e.g., RT0) and move it to the persistent graphics memory 880. As shown in FIG. 8A, in case of hybrid rendering with direct mode, each of the RTs (e.g., RT1, RT2, RT3) may be directly rendered to system memory 870 bypassing the local memory, while RT0 may still be rendered to the persistent graphics memory 880. Also, once the RT is stored in the persistent graphics memory 880, software may control this RT, and the software may hold the RT for multiple uses and release it at the appropriate time. For example, the software may determine that it can evict the RT and replace it with a better performing candidate RT. As shown in FIG. 8B, aspects presented herein may determine which render target to save in graphics memory (e.g., persistent graphics memory 840).

In some aspects, applications/games may come with different resolutions, such as 1920×1080 (HD or 1080p), 2560×1440 (QHD or 1440p), 3840×2160 (4K or 2160p), etc. Even a change in aspect ratio, such as 16:9 or 16:10, this may cause the variance in the size of the RTs to be supported. With the most common pixel format as 32 bits per pixel (bpp), the pGMEM space for one RT in games with resolution 1080p is approximately 8 MB, with 1440p it is approximately 14 MB, and in case of 4K it needs at least approximately 32 MB. Aspects presented herein may utilize a partial render target allocation. For instance, with a fixed size of the pGMEM, there may not be enough space to accommodate a render target completely. Aspects presented herein may allocate part of the RT in pGMEM and the rest in sysMEM. At command building stage, the driver may consider the available pGMEM space, surface formats and calculate how many lines (e.g., Y-lines), starting from the top left corner, it may store in the pGMEM. When a pixel's y-coordinate is less than or equal to its Y-line, the pixel may be located in the pGMEM. Otherwise, the pixel may be located in the system memory. Also, if the base address points to the bottom left of the image (API specific), the driver may handle this accordingly during surface partitioning.

FIG. 9A and FIG. 9B illustrate diagram 900 and diagram 950, respectively, including examples of surface allocation approaches. Diagram 900 in FIG. 9A depicts a full surface allocation 902. As shown in FIG. 9A, diagram 900 includes shader core 910, system memory 930 and persistent graphics memory 940 including a render target (e.g., RT0). FIG. 9A depicts that at least one render target (e.g., RT0) is stored in the persistent graphics memory 940. Diagram 900 shows that aspects presented herein may select a render target (e.g., RT0) and move it to the persistent graphics memory 940. As shown in FIG. 9A, in case of full surface allocation, the RT0 may be directly rendered to persistent graphics memory 940. Diagram 950 in FIG. 9B depicts a partial surface allocation 952. As shown in FIG. 9B, diagram 950 includes shader core 960, system memory 970 including a render target (e.g., RT0) and persistent graphics memory 980 including a render target (e.g., RT0). FIG. 9B depicts that at least one render target (e.g., RT0) is stored in the system memory 970 and at least one render target (e.g., RT0) is stored in the persistent graphics memory 980. Diagram 950 shows that aspects presented herein may select a render target (e.g., RT0) and move it to the persistent graphics memory 980. As shown in FIG. 9B, in case of partial surface allocation 952, a first half of an RT (e.g., RT0) may be directly rendered to system memory 970 bypassing the local memory, while a second half of RT0 may still be rendered to the persistent graphics memory 980. Also, once the RT is stored in the persistent graphics memory 980, software may control this RT, and the software may hold the RT for multiple uses and release it at the appropriate time. For example, the software may determine that it can evict the RT and replace it with a better performing candidate RT. As shown in FIG. 9B, aspects presented herein may determine which render target to save in graphics memory (e.g., persistent graphics memory 980) and/or which render target is going to be the most persistently used in graphics memory.

For full surface allocation and partial surface allocation, aspects presented herein may utilize the following instructions:

```
If (surface.pGMEM) {
    If (pixel y co-ordinate<=surface.PARTITION.Y) {
    Calculate the GMEM address, and send request to
        GMEM
    } else {
        Calculate the SYSMEM address, and send request to
            SYSMEM
    }
```

Additionally, in order to save memory, aspects presented herein may utilize a few other options. For instance, aspects presented herein may utilize a compressed pGMEM, which may buffer compressed traffic instead of uncompressed pGMEM. Aspects presented herein may also utilize a paged pGMEM, which may allocate surfaces as pages in a cache like architecture instead of buffer at the expense of pGMEM area. Aspects presented herein may also utilize the pGMEM as a sub-cache, which may have the pGMEM outside of GPU inside LLC as a sub-cache. Aspects presented herein may also utilize a rectangular partial surface, which may define a rectangle for a surface, when a pixel's (x, y) coordinate is inside the rectangle the pixel locates in pGMEM, otherwise the pixel may be located in system memory. Aspects presented herein may also utilize a multiple partial area in a surface, which may define multiple lines or multiple rectangles per surface, so multiple parts of a surface can be in the pGMEM. Aspects presented herein may also utilize dynamic paging in the pGMEM, which may define pGMEM into multiple pages/tiles (e.g., 64 kB or 1 MB). Also, this may define the pGMEM residential tile shape associated with the page size. During rendering, based on the pixel location, one page from the pGMEM may be allocated. If the allocation is granted, the tile may be in pGMEM, otherwise, the tile may be in system memory. There may be no page eviction during failed allocation like when pGMEM is full. Also, after a tile is allocated, it may stay in the pGMEM and the driver may need to issue explicit commands to deallocate pages. A graphics surface may be a render target, a source texture, buffer, or any kind of memory structure used to read from (and write to) during graphics processing.

In some aspects, the implementation of aspects presented herein may result in significant benefits both in terms of performance and power. The uplift in performance may be mainly due to bandwidth savings and/or due to the shorter load-store latencies for shaders. For instance, the pGMEM may be closer to the GPU shader system compared to sysMem or a last level cache (LLC). In addition to surface persistency, additional benefits may be achieved by discarding allocated surfaces, rather than resolving/writing back the allocated surfaces to sysMem. The 'discard' marker may be provided by an application to promote the driver safely discarding any surface that is not used across SubmitQ/cmdB/cmdL and/or a frame boundary. Additionally, aspects presented herein may include memory traffic savings and performance uplift due to the pGMEM feature. The pGMEM feature may consistently yields benefit when measured on performance/mm$^2$ or performance/watt metrics. In some aspects, the pGMEM size may be limited to a certain size (e.g., 8 MB) for the sake of system-on-chip (SoC) cost concern. However, this size may be easily extended to a bigger size (e.g., 128 MB) that covers multiple RTs. Also, the pGMEM may sit on a separate die for a multi-die package and it may be easier for software to manage that through a standard heap management.

Aspects of the present disclosure may include a number of benefits or advantages. For instance, aspects of the present disclosure may reduce the amount of memory bandwidth utilized by determining the render targets that contribute to more memory bandwidth. In order to do so, aspects of the present disclosure may identify the render targets that contribute to an increased amount of memory bandwidth compared to other render targets. Also, aspects presented herein may reduce the number of read and write operations in deferred rendering due to certain render targets. That is, aspects presented herein may identify the render targets that contribute to an increased number of read and write operations in deferred rendering. Aspects presented herein may also utilize a certain type of memory (e.g., persistent graphics memory) to identify the render targets that contribute to an increased amount of memory bandwidth. Further, aspects presented herein may utilize a certain type of memory (e.g., persistent graphics memory) to identify the render targets that contribute to an increased number of read and write operations.

Figure 10:
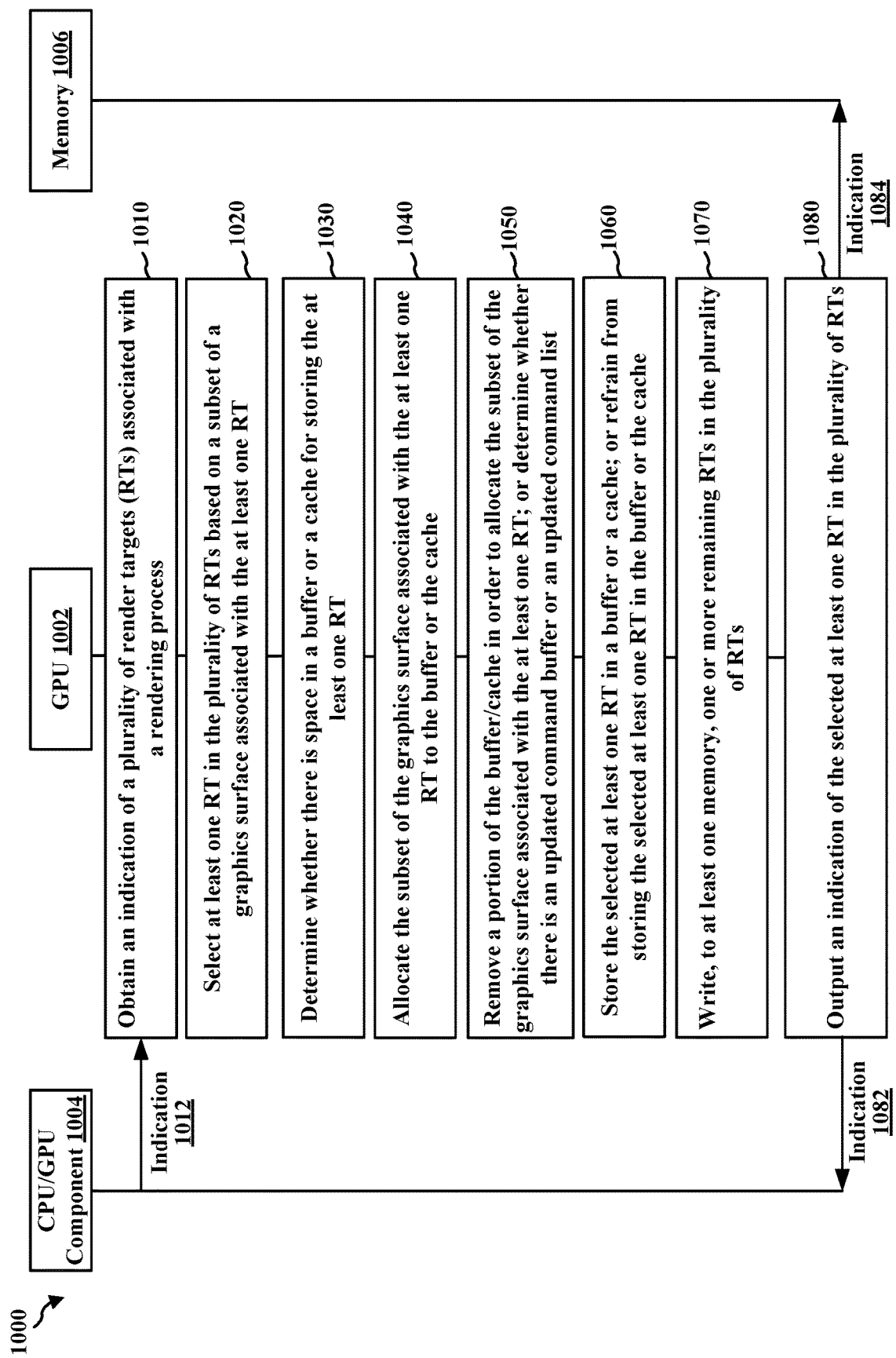
FIG. 10 is a communication flow diagram illustrating example communications between a GPU, a CPU, and a memory.

FIG. 10 is a communication flow diagram 1000 of graphics processing in accordance with one or more techniques of this disclosure. As shown in FIG. 10, diagram 1000 includes example communications between GPU 1002 (e.g., a GPU, a cache at a GPU, a GPU component, another graphics processor, a CPU, a CPU component, or another central processor), CPU/GPU component 1004 (e.g., a CPU, a cache at a CPU, a CPU component, another central processor, a GPU, a GPU component, or another graphics processor), and memory 1006 (e.g., a system memory, a graphics memory, or a memory or cache at a GPU), in accordance with one or more techniques of this disclosure.

At 1010, GPU 1002 may obtain an indication of a plurality of render targets (RTs) associated with a rendering process, where each of the plurality of RTs is associated with a subset of a graphics surface for the rendering process (e.g., GPU 1002 may obtain indication 1012 from CPU/GPU component 1004). The graphics surface may be at least one of: a texture surface, a static texture, a read/write texture, a procedural texture, a vertex buffer, or a frame buffer. The subset of the graphics surface may be less than all of the graphics surface. Also, the plurality of RTs may be associated with a memory location for a storage of a set of rendered pixels for the rendering process.

At 1020, GPU 1002 may select at least one RT in the plurality of RTs based on the subset of the graphics surface associated with the at least one RT. In some aspects, selecting the at least one RT may comprise: selecting the at least one RT that is associated with a highest amount of memory traffic in the plurality of RTs. The subset of the graphics surface associated with the at least one RT may be a portion of the subset of the graphics surface associated with the at least one RT, and the portion of the subset of the graphics surface associated with the at least one RT may include less than all of the subset of the graphics surface associated with the at least one RT. In some instances, selecting the at least one RT comprises: determining whether there is space in the buffer or the cache for storing the portion of the subset of the graphics surface associated with the at least one RT. Also, the portion of the subset of the graphics surface may correspond to a y-coordinate of the subset of the graphics surface, and determining whether there is space in the buffer or the cache comprises: determining whether there is space in the buffer or the cache for the portion of the subset of the graphics surface corresponding to the y-coordinate. In some aspects, the at least one RT may be associated with a highest amount of memory traffic in the plurality of RTs, such that the at least one RT includes a memory traffic that is higher than one or more remaining RTs in the plurality of RTs. Also, the memory traffic for the at least one RT may be associated with at least one of: a surface resolution, blend information, a type of surface (e.g., color, depth, normal, light, etc.), a usage frequency, or a surface rank for the subset of the graphics surface associated with the at least one RT.

At 1030, GPU 1002 may determine whether there is space in the buffer or the cache for storing the at least one RT.

At 1040, GPU 1002 may allocate, based on there being space in the buffer or the cache for storing the at least one RT, the subset of the graphics surface associated with the at least one RT to the buffer or the cache.

At 1050, GPU 1002 may remove, based on there not being space in the buffer or the cache for storing the at least one RT, a portion of the buffer or the cache in order to allocate the subset of the graphics surface associated with the at least one RT; or determine whether there is an updated command buffer or an updated command list for the subset of the graphics surface associated with the at least one RT. If there is not the updated command buffer or the updated command list for the subset of the graphics surface associated with the at least one RT, the GPU may configure the updated command buffer or the updated command list for the subset of the graphics surface associated with the at least one RT. If there is the updated command buffer or the updated command list for the subset of the graphics surface associated with the at least one RT, the GPU may at least one of: identify there is a resource barrier for the updated command buffer or the updated command list; identify a usage count for the subset of the graphics surface associated with the at least one RT; identify a surface resolution and a surface format for the subset of the graphics surface associated with the at least one RT; or identify a surface rank for the subset of the graphics surface associated with the at least one RT.

At 1060, GPU 1002 may store the selected at least one RT in a buffer or a cache, or refrain from storing the selected at least one RT in the buffer or the cache. Refraining from storing in the buffer/cache may refer to not storing in the buffer/cache or stopping from storing in the buffer/cache. In some aspects, the buffer may be a local buffer in a graphics processing unit (GPU) or a graphics memory in the GPU, and the cache may be a local cache in the GPU or a graphics cache in the GPU.

At 1070, GPU 1002 may write, to at least one memory, one or more remaining RTs in the plurality of RTs, where the one or more remaining RTs do not include the selected at least one RT. The at least one memory may be a system memory in a graphics processing unit (GPU), a persistent memory in the GPU, a persistent graphics memory (GMEM) in the GPU, a persistent video memory in the GPU, or a persistent buffer in the GPU. In some aspects, the at least one memory may comprise a first memory and a second memory, and where writing, to the at least one memory, the one or more remaining RTs may comprise: writing, to the first memory and the second memory, the one or more remaining RTs in the plurality of RTs. Also, the first memory may be a system memory in a graphics processing unit (GPU), and the second memory may be a persistent memory in the GPU.

At 1080, GPU 1002 may output an indication of the selected at least one RT in the plurality of RTs. In some aspects, outputting the indication of the selected at least once RT may comprise: transmitting the indication of the selected at least one RT in the plurality of RTs. For example, GPU 1002 may transmit indication 1082 to CPU/GPU component 1004. Also, outputting the indication of the selected at least one RT may comprise: storing the indication of the selected at least one RT in the plurality of RTs. For example, GPU 1002 may store indication 1084 in the memory 1006.

Figure 11:
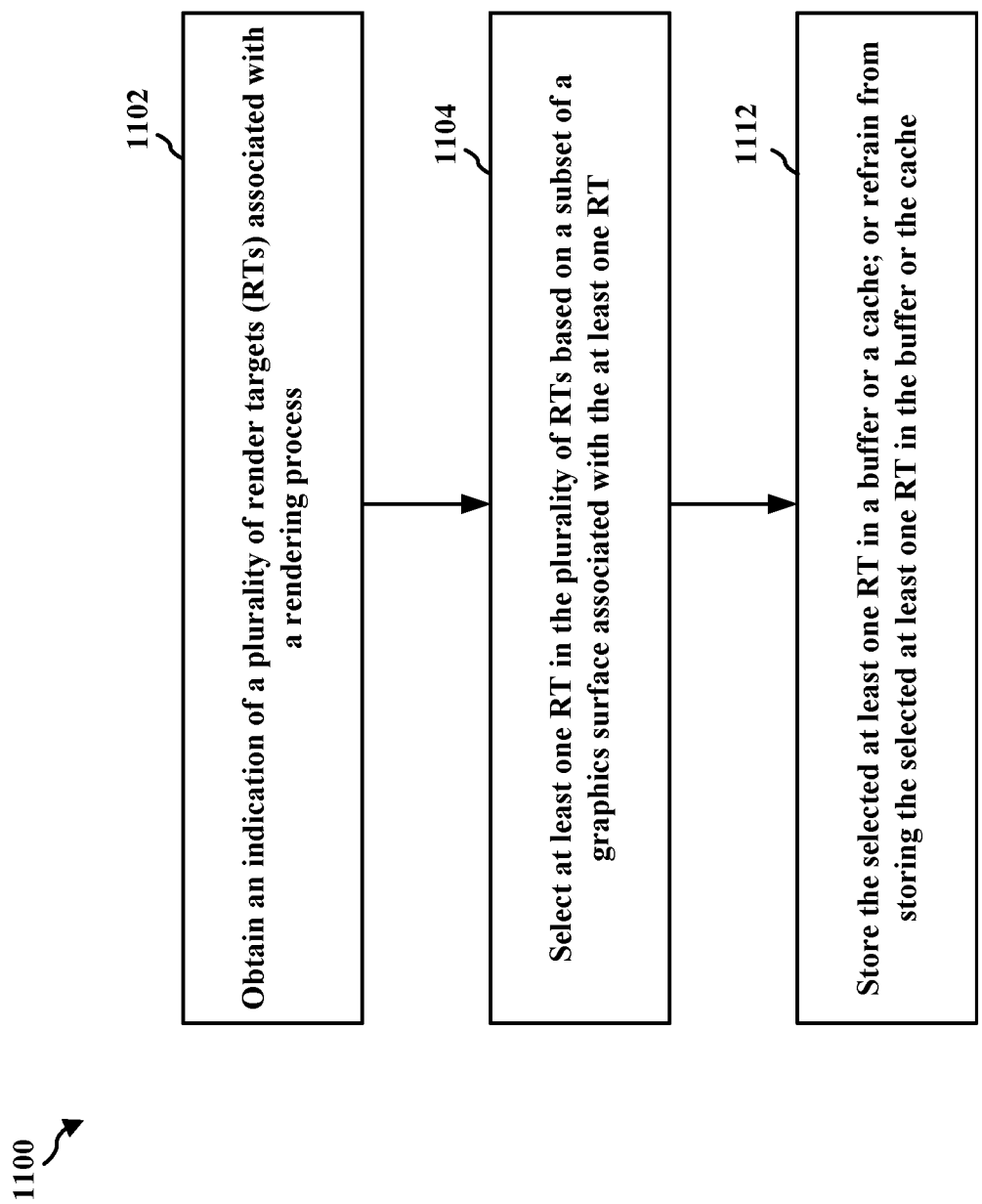
FIG. 11 is a flowchart of an example method of graphics processing.

FIG. 11 is a flowchart 1100 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-10. The methods described herein may provide a number of benefits, such as improving resource utilization and/or power savings.

At 1102, the GPU may obtain an indication of a plurality of render targets (RTs) associated with a rendering process, where each of the plurality of RTs is associated with a subset of a graphics surface for the rendering process, as described in connection with the examples in FIGS. 1-10. For example, as described in 1010 of FIG. 10, GPU 1002 may obtain an indication of a plurality of render targets (RTs) associated with a rendering process, where each of the plurality of RTs is associated with a subset of a graphics surface for the rendering process. Further, step 1102 may be performed by processing unit 120 in FIG. 1. The graphics surface may be at least one of: a texture surface, a static texture, a read/write texture, a procedural texture, a vertex buffer, or a frame buffer. Also, the plurality of RTs may be associated with a memory location for a storage of a set of rendered pixels for the rendering process.

At 1104, the GPU may select at least one RT in the plurality of RTs based on the subset of the graphics surface associated with the at least one RT, as described in connection with the examples in FIGS. 1-10. For example, as described in 1020 of FIG. 10, GPU 1002 may select at least one RT in the plurality of RTs based on the subset of the graphics surface associated with the at least one RT. Further, step 1104 may be performed by processing unit 120 in FIG. 1. In some aspects, selecting the at least one RT may comprise: selecting the at least one RT that is associated with a highest amount of memory traffic in the plurality of RTs. The subset of the graphics surface associated with the at least one RT may be a portion of the subset of the graphics surface associated with the at least one RT, and the portion of the subset of the graphics surface associated with the at least one RT may include less than all of the subset of the graphics surface associated with the at least one RT. In some instances, selecting the at least one RT comprises: determining whether there is space in the buffer or the cache for storing the portion of the subset of the graphics surface associated with the at least one RT. Also, the portion of the subset of the graphics surface may correspond to a y-coordinate of the subset of the graphics surface, and determining whether there is space in the buffer or the cache comprises: determining whether there is space in the buffer or the cache for the portion of the subset of the graphics surface corresponding to the y-coordinate. In some aspects, the at least one RT may be associated with a highest amount of memory traffic in the plurality of RTs, such that the at least one RT includes a memory traffic that is higher than one or more remaining RTs in the plurality of RTs. Also, the memory traffic for the at least one RT may be associated with at least one of: a surface resolution, blend information, a type of surface (e.g., color, depth, normal, light, etc.), a usage frequency, or a surface rank for the subset of the graphics surface associated with the at least one RT.

At 1112, the GPU may store the selected at least one RT in a buffer or a cache, or refrain from storing the selected at least one RT in the buffer or the cache, as described in connection with the examples in FIGS. 1-10. For example, as described in 1060 of FIG. 10, GPU 1002 may store the selected at least one RT in a buffer or a cache, or refrain from storing the selected at least one RT in the buffer or the cache. Further, step 1112 may be performed by processing unit 120 in FIG. 1. In some aspects, the buffer may be a local buffer in a graphics processing unit (GPU) or a graphics memory in the GPU, and the cache may be a local cache in the GPU or a graphics cache in the GPU.

Figure 12:
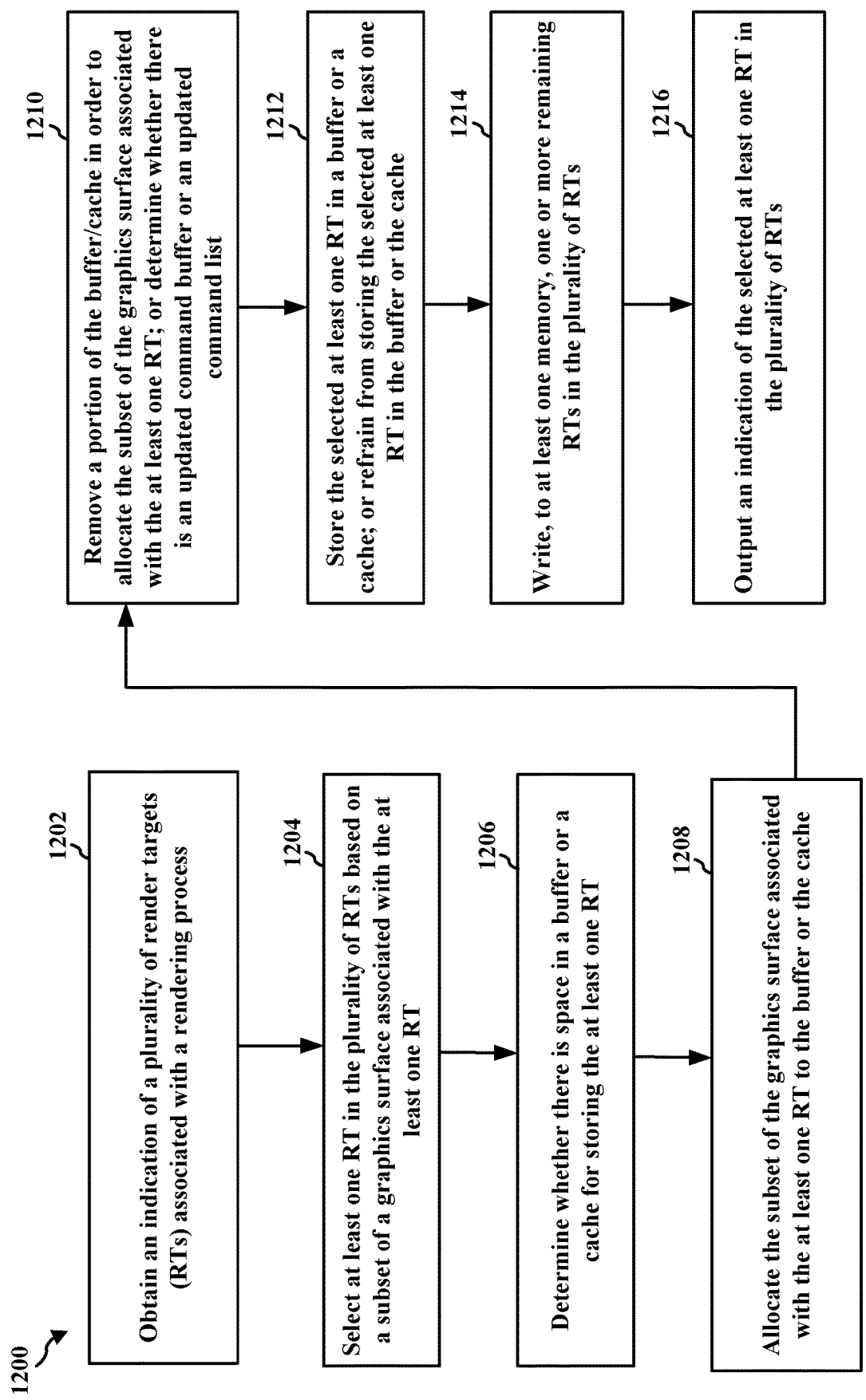
FIG. 12 is a flowchart of an example method of graphics processing.

FIG. 12 is a flowchart 1200 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-10. The methods described herein may provide a number of benefits, such as improving resource utilization and/or power savings.

At 1202, the GPU may obtain an indication of a plurality of render targets (RTs) associated with a rendering process, where each of the plurality of RTs is associated with a subset of a graphics surface for the rendering process, as described in connection with the examples in FIGS. 1-10. For example, as described in 1010 of FIG. 10, GPU 1002 may obtain an indication of a plurality of render targets (RTs) associated with a rendering process, where each of the plurality of RTs is associated with a subset of a graphics surface for the rendering process. Further, step 1202 may be performed by processing unit 120 in FIG. 1. The graphics surface may be at least one of: a texture surface, a static texture, a read/write texture, a procedural texture, a vertex buffer, or a frame buffer. Also, the plurality of RTs may be associated with a memory location for a storage of a set of rendered pixels for the rendering process.

At 1204, the GPU may select at least one RT in the plurality of RTs based on the subset of the graphics surface associated with the at least one RT, as described in connection with the examples in FIGS. 1-10. For example, as described in 1020 of FIG. 10, GPU 1002 may select at least one RT in the plurality of RTs based on the subset of the graphics surface associated with the at least one RT. Further, step 1204 may be performed by processing unit 120 in FIG. 1. In some aspects, selecting the at least one RT may comprise: selecting the at least one RT that is associated with a highest amount of memory traffic in the plurality of RTs. The subset of the graphics surface associated with the at least one RT may be a portion of the subset of the graphics surface associated with the at least one RT, and the portion of the subset of the graphics surface associated with the at least one RT may include less than all of the subset of the graphics surface associated with the at least one RT. In some instances, selecting the at least one RT comprises: determining whether there is space in the buffer or the cache for storing the portion of the subset of the graphics surface associated with the at least one RT. Also, the portion of the subset of the graphics surface may correspond to a y-coordinate of the subset of the graphics surface, and determining whether there is space in the buffer or the cache comprises: determining whether there is space in the buffer or the cache for the portion of the subset of the graphics surface corresponding to the y-coordinate. In some aspects, the at least one RT may be associated with a highest amount of memory traffic in the plurality of RTs, such that the at least one RT includes a memory traffic that is higher than one or more remaining RTs in the plurality of RTs. Also, the memory traffic for the at least one RT may be associated with at least one of: a surface resolution, blend information, a type of surface (e.g., color, depth, normal, light, etc.), a usage frequency, or a surface rank for the subset of the graphics surface associated with the at least one RT.

At 1206, the GPU may determine whether there is space in the buffer or the cache for storing the at least one RT, as described in connection with the examples in FIGS. 1-10. For example, as described in 1030 of FIG. 10, GPU 1002 may determine whether there is space in the buffer or the cache for storing the at least one RT. Further, step 1206 may be performed by processing unit 120 in FIG. 1.

At 1208, the GPU may allocate, based on there being space in the buffer or the cache for storing the at least one RT, the subset of the graphics surface associated with the at least one RT to the buffer or the cache, as described in connection with the examples in FIGS. 1-10. For example, as described in 1040 of FIG. 10, GPU 1002 may allocate, based on there being space in the buffer or the cache for storing the at least one RT, the subset of the graphics surface associated with the at least one RT to the buffer or the cache. Further, step 1208 may be performed by processing unit 120 in FIG. 1.

At 1210, the GPU may remove, based on there not being space in the buffer or the cache for storing the at least one RT, a portion of the buffer or the cache in order to allocate the subset of the graphics surface associated with the at least one RT; or determine whether there is an updated command buffer or an updated command list for the subset of the graphics surface associated with the at least one RT, as described in connection with the examples in FIGS. 1-10. For example, as described in 1050 of FIG. 10, GPU 1002 may remove, based on there not being space in the buffer or the cache for storing the at least one RT, a portion of the buffer or the cache in order to allocate the subset of the graphics surface associated with the at least one RT; or determine whether there is an updated command buffer or an updated command list for the subset of the graphics surface associated with the at least one RT. Further, step 1210 may be performed by processing unit 120 in FIG. 1. If there is not the updated command buffer or the updated command list for the subset of the graphics surface associated with the at least one RT, the GPU may configure the updated command buffer or the updated command list for the subset of the graphics surface associated with the at least one RT. If there is the updated command buffer or the updated command list for the subset of the graphics surface associated with the at least one RT, the GPU may at least one of: identify there is a resource barrier for the updated command buffer or the updated command list; identify a usage count for the subset of the graphics surface associated with the at least one RT; identify a surface resolution and a surface format for the subset of the graphics surface associated with the at least one RT; or identify a surface rank for the subset of the graphics surface associated with the at least one RT.

At 1212, the GPU may store the selected at least one RT in a buffer or a cache, or refrain from storing the selected at least one RT in the buffer or the cache, as described in connection with the examples in FIGS. 1-10. For example, as described in 1060 of FIG. 10, GPU 1002 may store the selected at least one RT in a buffer or a cache, or refrain from storing the selected at least one RT in the buffer or the cache. Further, step 1212 may be performed by processing unit 120 in FIG. 1. In some aspects, the buffer may be a local buffer in a graphics processing unit (GPU) or a graphics memory in the GPU, and the cache may be a local cache in the GPU or a graphics cache in the GPU.

At 1214, the GPU may write, to at least one memory, one or more remaining RTs in the plurality of RTs, where the one or more remaining RTs do not include the selected at least one RT, as described in connection with the examples in FIGS. 1-10. For example, as described in 1070 of FIG. 10, GPU 1002 may write, to at least one memory, one or more remaining RTs in the plurality of RTs, where the one or more remaining RTs do not include the selected at least one RT. Further, step 1214 may be performed by processing unit 120 in FIG. 1. The at least one memory may be a system memory in a graphics processing unit (GPU), a persistent memory in the GPU, a persistent graphics memory (GMEM) in the GPU, a persistent video memory in the GPU, or a persistent buffer in the GPU. In some aspects, the at least one memory may comprise a first memory and a second memory, and where writing, to the at least one memory, the one or more remaining RTs may comprise: writing, to the first memory and the second memory, the one or more remaining RTs in the plurality of RTs. Also, the first memory may be a system memory in a graphics processing unit (GPU), and the second memory may be a persistent memory in the GPU.

At 1216, the GPU may output an indication of the selected at least one RT in the plurality of RTs, as described in connection with the examples in FIGS. 1-10. For example, as described in 1080 of FIG. 10, GPU 1002 may output an indication of the selected at least one RT in the plurality of RTs. Further, step 1216 may be performed by processing unit 120 in FIG. 1. In some aspects, outputting the indication of the selected at least one RT may comprise: transmitting the indication of the selected at least one RT in the plurality of RTs. Also, outputting the indication of the selected at least one RT may comprise: storing the indication of the selected at least one RT in the plurality of RTs.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for obtaining an indication of a plurality of render targets (RTs) associated with a rendering process, where each of the plurality of RTs is associated with a subset of a graphics surface for the rendering process. The apparatus, e.g., processing unit 120, may also include means for selecting at least one RT in the plurality of RTs based on the subset of the graphics surface associated with the at least one RT. The apparatus, e.g., processing unit 120, may also include means for storing the selected at least one RT in a buffer or a cache, or refraining from storing the selected at least one RT in the buffer or the cache. The apparatus, e.g., processing unit 120, may also include means for determining whether there is space in the buffer or the cache for storing the at least one RT. The apparatus, e.g., processing unit 120, may also include means for allocating, based on there being space in the buffer or the cache for storing the at least one RT, the subset of the graphics surface associated with the at least one RT to the buffer or the cache. The apparatus, e.g., processing unit 120, may also include means for removing, based on there not being space in the buffer or the cache for storing the at least one RT, a portion of the buffer or the cache in order to allocate the subset of the graphics surface associated with the at least one RT. The apparatus, e.g., processing unit 120, may also include means for determining whether there is an updated command buffer or an updated command list for the subset of the graphics surface associated with the at least one RT. The apparatus, e.g., processing unit 120, may also include means for writing, to at least one memory, one or more remaining RTs in the plurality of RTs, where the one or more remaining RTs do not include the selected at least one RT. The apparatus, e.g., processing unit 120, may also include means for outputting an indication of the selected at least one RT in the plurality of RTs.

The subject matter described herein may be implemented to realize one or more benefits or advantages. For instance, the described graphics processing techniques may be used by a GPU, a graphics processor, or some other processor that may perform graphics processing to implement the persistent graphics memory techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize persistent graphics memory techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs. e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and, based at least in part on information stored in the memory, the at least one processor is configured to: obtain an indication of a plurality of render targets (RTs) associated with a rendering process, wherein each of the plurality of RTs is associated with a subset of a graphics surface for the rendering process; select at least one RT in the plurality of RTs based on the subset of the graphics surface associated with the at least one RT; and store the selected at least one RT in a buffer or a cache, or refrain from storing the selected at least one RT in the buffer or the cache.

Aspect 2 is the apparatus of aspect 1, wherein to select the at least one RT, the at least one processor, individually or in any combination, is configured to: select the at least one RT that is associated with a highest amount of memory traffic in the plurality of RTs.

Aspect 3 is the apparatus of aspect 2, wherein the at least one processor, individually or in any combination, is further configured to: determine whether there is space in the buffer or the cache for storing the at least one RT.

Aspect 4 is the apparatus of aspect 3, wherein the at least one processor, individually or in any combination, is further configured to: allocate, based on there being space in the buffer or the cache for storing the at least one RT, the subset of the graphics surface associated with the at least one RT to the buffer or the cache.

Aspect 5 is the apparatus of aspect 3, wherein the at least one processor, individually or in any combination, is further configured to: remove, based on there not being space in the buffer or the cache for storing the at least one RT, a portion of the buffer or the cache in order to allocate the subset of the graphics surface associated with the at least one RT; or determine whether there is an updated command buffer or an updated command list for the subset of the graphics surface associated with the at least one RT.

Aspect 6 is the apparatus of aspect 5, wherein there is not the updated command buffer or the updated command list for the subset of the graphics surface associated with the at least one RT, and wherein the at least one processor, individually or in any combination, is further configured to: configure the updated command buffer or the updated command list for the subset of the graphics surface associated with the at least one RT.

Aspect 7 is the apparatus of aspect 5, wherein there is the updated command buffer or the updated command list for the subset of the graphics surface associated with the at least one RT, and wherein the at least one processor, individually or in any combination, is further configured to at least one of: identify there is a resource barrier for the updated command buffer or the updated command list; identify a usage count for the subset of the graphics surface associated with the at least one RT; identify a surface resolution, and a surface format for the subset of the graphics surface associated with the at least one RT; or identify a surface rank for the subset of the graphics surface associated with the at least one RT.

Aspect 8 is the apparatus of any of aspects 1 to 7, wherein the at least one processor, individually or in any combination, is further configured to: write, to at least one first memory, one or more remaining RTs in the plurality of RTs, wherein the one or more remaining RTs do not include the selected at least one RT.

Aspect 9 is the apparatus of aspect 8, the at least one first memory comprises a first memory and a second memory, and wherein to write, to the at least one first memory, the one or more remaining RTs, the at least one processor, individually or in any combination, is configured to: write, to the first memory and the second memory, the one or more remaining RTs in the plurality of RTs.

Aspect 10 is the apparatus of aspect 9, wherein the first memory is a system memory in a graphics processing unit (GPU), and wherein the second memory is a persistent memory in the GPU.

Aspect 11 is the apparatus of aspect 8, wherein the at least one first memory is a system memory in a graphics processing unit (GPU), a persistent memory in the GPU, a persistent graphics memory (GMEM) in the GPU, a persistent video memory in the GPU, or a persistent buffer in the GPU.

Aspect 12 is the apparatus of any of aspects 1 to 11, wherein the subset of the graphics surface associated with the at least one RT is a portion of the subset of the graphics surface associated with the at least one RT, and wherein the portion of the subset of the graphics surface associated with the at least one RT includes less than all of the subset of the graphics surface associated with the at least one RT.

Aspect 13 is the apparatus of aspect 12, wherein to select the at least one RT, the at least one processor, individually or in any combination, is configured to: determine whether there is space in the buffer or the cache for storing the portion of the subset of the graphics surface associated with the at least one RT.

Aspect 14 is the apparatus of aspect 13, wherein the portion of the subset of the graphics surface corresponds to a y-coordinate of the subset of the graphics surface, and wherein to determine whether there is space in the buffer or the cache, the at least one processor, individually or in any combination, is configured to: determine whether there is space in the buffer or the cache for the portion of the subset of the graphics surface corresponding to the y-coordinate.

Aspect 15 is the apparatus of any of aspects 1 to 14, wherein the at least one RT is associated with a highest amount of memory traffic in the plurality of RTs, such that the at least one RT includes a memory traffic that is higher than one or more remaining RTs in the plurality of RTs.

Aspect 16 is the apparatus of aspect 15, wherein the memory traffic for the at least one RT is associated with at least one of: a surface resolution, blend information, a type of surface, a usage frequency, or a surface rank for the subset of the graphics surface associated with the at least one RT.

Aspect 17 is the apparatus of any of aspects 1 to 16, wherein the graphics surface is at least one of: a texture surface, a static texture, a read/write texture, a procedural texture, a vertex buffer, or a frame buffer.

Aspect 18 is the apparatus of any of aspects 1 to 17, further comprising at least one of an antenna or a transceiver coupled to the at least one processor, wherein to obtain the indication of the plurality of RTs, the at least one processor, individually or in any combination, is configured to: obtain, via at least one of the antenna or the transceiver, the indication of the plurality of RTs, and wherein the plurality of RTs is associated with a memory location for a storage of a set of rendered pixels for the rendering process.

Aspect 19 is the apparatus of any of aspects 1 to 18, wherein the buffer is a local buffer in a graphics processing unit (GPU) or a graphics memory in the GPU, and wherein the cache is a local cache in the GPU or a graphics cache in the GPU.

Aspect 20 is the apparatus of any of aspects 1 to 19, wherein the at least one processor, individually or in any combination, is further configured to: output an indication of the selected at least one RT in the plurality of RTs.

Aspect 21 is the apparatus of aspect 20, wherein to output the indication of the selected at least one RT, the at least one processor, individually or in any combination, is configured to: transmit the indication of the selected at least one RT in the plurality of RTs; or store the indication of the selected at least one RT in the plurality of RTs.

Aspect 22 is the apparatus of any of aspects 1 to 21, further including at least one of an antenna or a transceiver coupled to the at least one processor.

Aspect 23 is a method of graphics processing for implementing any of aspects 1 to 21.

Aspect 24 is an apparatus for graphics processing including means for implementing any of aspects 1 to 21.

Aspect 25 is a computer-readable medium (e.g., a non-transitory computer-readable medium) storing computer executable code, the code when executed by at least one processor causes the at least one processor to implement any of aspects 1 to 21.

What is claimed is:

1. An apparatus for graphics processing, comprising:
    at least one memory; and
    at least one processor coupled to the at least one memory and, based at least in part on information stored in the at least one memory, the at least one processor is configured to:
        obtain an indication of a plurality of render targets (RTs) associated with a rendering process, wherein each of the plurality of RTs is associated with a subset of a graphics surface for the rendering process;

select at least one RT in the plurality of RTs based on the subset of the graphics surface associated with the at least one RT, wherein the selected at least one RT is associated with a highest amount of memory traffic in the plurality of RTs; and store the selected at least one RT in a buffer or a cache, or refrain from storing the selected at least one RT in the buffer or the cache.

2. The apparatus of claim 1, wherein the at least one processor is further configured to:
determine whether there is space in the buffer or the cache for storing the at least one RT.

3. The apparatus of claim 2, wherein the at least one processor is further configured to:
allocate, based on there being space in the buffer or the cache for storing the at least one RT, the subset of the graphics surface associated with the at least one RT to the buffer or the cache.

4. The apparatus of claim 2, wherein the at least one processor is further configured to:
remove, based on there not being space in the buffer or the cache for storing the at least one RT, a portion of the buffer or the cache in order to allocate the subset of the graphics surface associated with the at least one RT; or
determine whether there is an updated command buffer or an updated command list for the subset of the graphics surface associated with the at least one RT.

5. The apparatus of claim 4, wherein there is not the updated command buffer or the updated command list for the subset of the graphics surface associated with the at least one RT, and wherein the at least one processor is further configured to:
configure the updated command buffer or the updated command list for the subset of the graphics surface associated with the at least one RT.

6. The apparatus of claim 4, wherein there is the updated command buffer or the updated command list for the subset of the graphics surface associated with the at least one RT, and wherein the at least one processor is further configured to at least one of:
identify there is a resource barrier for the updated command buffer or the updated command list;
identify a usage count for the subset of the graphics surface associated with the at least one RT;
identify a surface resolution and a surface format for the subset of the graphics surface associated with the at least one RT; or
identify a surface rank for the subset of the graphics surface associated with the at least one RT.

7. The apparatus of claim 1, wherein the at least one processor is further configured to:
write, to at least one first memory, one or more remaining RTs in the plurality of RTs, wherein the one or more remaining RTs do not include the selected at least one RT.

8. The apparatus of claim 7, wherein the at least one first memory comprises a first memory and a second memory, and wherein to write, to the at least one first memory, the one or more remaining RTs, the at least one processor is configured to: write, to the first memory and the second memory, the one or more remaining RTs in the plurality of RTs.

9. The apparatus of claim 8, wherein the first memory is a system memory in a graphics processing unit (GPU), and wherein the second memory is a persistent memory in the GPU.

10. The apparatus of claim 7, wherein the at least one first memory is a system memory in a graphics processing unit (GPU), a persistent memory in the GPU, a persistent graphics memory (GMEM) in the GPU, a persistent video memory in the GPU, or a persistent buffer in the GPU.

11. The apparatus of claim 1, wherein the subset of the graphics surface associated with the at least one RT is a portion of the subset of the graphics surface associated with the at least one RT, and wherein the portion of the subset of the graphics surface associated with the at least one RT includes less than all of the subset of the graphics surface associated with the at least one RT.

12. The apparatus of claim 11, wherein to select the at least one RT, the at least one processor is configured to: determine whether there is space in the buffer or the cache for storing the portion of the subset of the graphics surface associated with the at least one RT.

13. The apparatus of claim 12, wherein the portion of the subset of the graphics surface corresponds to a y-coordinate of the subset of the graphics surface, and wherein to determine whether there is space in the buffer or the cache, the at least one processor is configured to: determine whether there is space in the buffer or the cache for the portion of the subset of the graphics surface corresponding to the y-coordinate.

14. The apparatus of claim 1, wherein the at least one RT is associated with a highest amount of memory traffic in the plurality of RTs, such that the at least one RT includes memory traffic that is higher than one or more remaining RTs in the plurality of RTs.

15. The apparatus of claim 14, wherein the memory traffic for the at least one RT is associated with at least one of: a surface resolution, blend information, a type of surface, a usage frequency, or a surface rank for the subset of the graphics surface associated with the at least one RT.

16. The apparatus of claim 1, wherein the graphics surface is at least one of: a texture surface, a static texture, a read/write texture, a procedural texture, a vertex buffer, or a frame buffer.

17. The apparatus of claim 1, further comprising at least one of an antenna or a transceiver coupled to the at least one processor, wherein to obtain the indication of the plurality of RTs, the at least one processor is configured to: obtain, via at least one of the antenna or the transceiver, the indication of the plurality of RTs, and wherein the plurality of RTs is associated with a memory location for a storage of a set of rendered pixels for the rendering process.

18. The apparatus of claim 1, wherein the buffer is a local buffer in a graphics processing unit (GPU) or a graphics memory in the GPU, and wherein the cache is a local cache in the GPU or a graphics cache in the GPU.

19. The apparatus of claim 1, wherein the at least one processor is further configured to:
output an indication of the selected at least one RT in the plurality of RTs.

20. The apparatus of claim 19, wherein to output the indication of the selected at least one RT, the at least one processor is configured to:
transmit the indication of the selected at least one RT in the plurality of RTs; or
store the indication of the selected at least one RT in the plurality of RTs.

21. A method of graphics processing, comprising:
obtaining an indication of a plurality of render targets (RTs) associated with a rendering process, wherein each of the plurality of RTs is associated with a subset of a graphics surface for the rendering process;

selecting at least one RT in the plurality of RTs based on the subset of the graphics surface associated with the at least one RT, wherein the selected at least one RT is associated with a highest amount of memory traffic in the plurality of RTs; and storing the selected at least one RT in a buffer or a cache, or refraining from storing the selected at least one RT in the buffer or the cache.

22. The method of claim 2, further comprising:

determining whether there is space in the buffer or the cache for storing the at least one RT; and allocating, based on there being space in the buffer or the cache for storing the at least one RT, the subset of the graphics surface associated with the at least one RT to the buffer or the cache.

23. The method of claim 21, further comprising:

determining whether there is space in the buffer or the cache for storing the at least one RT; and removing, based on there not being space in the buffer or the cache for storing the at least one RT, a portion of the buffer or the cache in order to allocate the subset of the graphics surface associated with the at least one RT; or determining whether there is an updated command buffer or an updated command list for the subset of the graphics surface associated with the at least one RT.

24. The method of claim 21, further comprising:

writing, to at least one memory, one or more remaining RTs in the plurality of RTs, wherein the one or more remaining RTs do not include the selected at least one RT, wherein the at least one memory comprises a first memory and a second memory, and wherein writing, to the at least one memory, the one or more remaining RTs comprises: writing, to the first memory and the second memory, the one or more remaining RTs in the plurality of RTs.

25. The method of claim 21, wherein the subset of the graphics surface associated with the at least one RT is a portion of the subset of the graphics surface associated with the at least one RT, and wherein the portion of the subset of the graphics surface associated with the at least one RT includes less than all of the subset of the graphics surface associated with the at least one RT.

26. The method of claim 25, wherein selecting the at least one RT comprises: determining whether there is space in the buffer or the cache for storing the portion of the subset of the graphics surface associated with the at least one RT, wherein the portion of the subset of the graphics surface corresponds to a y-coordinate of the subset of the graphics surface, and wherein determining whether there is space in the buffer or the cache comprises: determining whether there is space in the buffer or the cache for the portion of the subset of the graphics surface corresponding to the y-coordinate.

27. An apparatus for graphics processing, comprising:

means for obtaining an indication of a plurality of render targets (RTs) associated with a rendering process, wherein each of the plurality of RTs is associated with a subset of a graphics surface for the rendering process;

means for selecting at least one RT in the plurality of RTs based on the subset of the graphics surface associated with the at least one RT, wherein the selected at least one RT is associated with a highest amount of memory traffic in the plurality of RTs; and means for storing the selected at least one RT in a buffer or a cache, or refraining from storing the selected at least one RT in the buffer or the cache.

28. A computer-readable medium storing computer executable code for graphics processing, the code when executed by at least one processor causes the at least one processor to:

obtain an indication of a plurality of render targets (RTs) associated with a rendering process, wherein each of the plurality of RTs is associated with a subset of a graphics surface for the rendering process;

select at least one RT in the plurality of RTs based on the subset of the graphics surface associated with the at least one RT, wherein the selected at least one RT is associated with a highest amount of memory traffic in the plurality of RTs; and store the selected at least one RT in a buffer or a cache, or refraining from storing the selected at least one RT in the buffer or the cache.

* * * * *